(12) United States Patent
Sugaya et al.

(10) Patent No.: US 6,369,938 B1
(45) Date of Patent: *Apr. 9, 2002

(54) MULTI-WAVELENGTH LIGHT AMPLIFIER

(75) Inventors: Yasushi Sugaya; Miki Takeda; Susumu Kinoshita; Terumi Chikama, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/339,258

(22) Filed: Jun. 24, 1999

Related U.S. Application Data

(63) Continuation of application No. 08/655,027, filed on May 28, 1996, now Pat. No. 6,055,092.

(51) Int. Cl.[7] .................................................. H01S 3/00
(52) U.S. Cl. ............. 359/341.42; 359/160; 359/337.11; 359/337.13
(58) Field of Search ................................ 359/174, 337, 359/341, 160, 179, 337.11, 337.13, 341.42

(56) References Cited

U.S. PATENT DOCUMENTS

| | | | |
|---|---|---|---|
| 4,644,145 A | 2/1987 | Gundner | ..................... 359/141 |
| 5,050,949 A | 9/1991 | DiGiovanni et al. | |
| 5,177,634 A | 1/1993 | Way | |

(List continued on next page.)

FOREIGN PATENT DOCUMENTS

| | | |
|---|---|---|
| GB | 2 244 595 | 12/1991 |
| JP | 3-206427 | 9/1991 |
| JP | 4-3029 | 1/1992 |
| JP | 5-63259 | 3/1993 |
| JP | 5-107573 | 4/1993 |
| JP | 5-241209 | 9/1993 |
| JP | 7-212315 | 8/1995 |

OTHER PUBLICATIONS

Desurvire, E., "Erbium Doped Fiber Amplifiers", John–Wiley & Sons, ISBN 0–471–58977–2, Texbook, pp. 480–487, 1994.*

Y. Sugaya et al., "Experimental Investigation for the Designing of EDFA in WDM Transmission System" Proceedings of the 1995 IEICE General Conference B–1098 published on Mar. 10, 1995 (with complete English translation).

Japanese Publication "Er:Doped Fiber Amplifer for WDM Transmission Using Fiber Gain Control", Technical Report of IEICE, OCS94–66, OPE94, Nov. 1994. (including English language translation).

Sagaya et al., Novel configuration for low–noise and wide–dynamic–range Er–doped fiber amplifier for WDM systems, OAA '95 paper FC3, Jun. 16, 1995, 4 pages.

Y. Sugaya et al., "Configuration Design of Multi–wavelength Er–doped Fiber Amplifier for WDM Transmission System" Technical Report of IEICE OCS95–36, published on Jul. 26, 1995. (with complete translation).

Y. Sugaya et al., "Novel Configuration For Low–Noise and Wide–Dynamic–Range Er–Doped Fiber Amplifier For WDM Systems" OAA '95, FC3 (1995).

(List continued on next page.)

Primary Examiner—Nelson Moskowitz
(74) Attorney, Agent, or Firm—Staas & Halsey LLP

(57) ABSTRACT

A multi-wavelength light amplifier includes a first-stage light amplifier which has a first light amplifying optical fiber amplifying a light input, a second-stage light amplifier which has a second light amplifying optical fiber amplifying a first light output from the first-stage light amplifier, and an optical system which maintains a second light output of the second-stage light amplifier at a constant power level. The first-stage and second-stage light amplifiers have different gain vs wavelength characteristics so that the multi-wavelength light amplifier has no wavelength-dependence of a gain thereof.

51 Claims, 15 Drawing Sheets

U.S. PATENT DOCUMENTS

| | | | |
|---|---|---|---|
| 5,225,922 | A | 7/1993 | Chraplyvy et al. |
| 5,239,607 | A | 8/1993 | da Silva et al. |
| 5,253,104 | A | 10/1993 | Delavaux .................... 359/341 |
| 5,280,383 | A | 1/1994 | Federici et al. |
| 5,406,404 | A | 4/1995 | DiGiovanni et al. |
| 5,430,572 | A | 7/1995 | DiGiovanni et al. |
| 5,436,760 | A | 7/1995 | Nakabayashi ............... 359/341 |
| 5,457,811 | A * | 10/1995 | Lemson ..................... 455/67.1 |
| 5,497,264 | A | 3/1996 | Bayart et al. |
| 5,506,724 | A | 4/1996 | Shimizu et al. |
| 5,539,563 | A | 7/1996 | Park |
| 5,664,131 | A | 9/1997 | Sugiya ........................ 359/341 |
| 5,745,276 | A | 4/1998 | Ho et al. .................... 359/189 |
| 5,801,858 | A | 9/1998 | Roberts et al. ............. 359/114 |
| 6,094,296 | A * | 7/2000 | Kosaka ........................ 359/341 |

OTHER PUBLICATIONS

S.F. Su et al., "Gain Equalization in Multiwavelength Lightwave Systems Using Acoustooptic Tunable Filters" IEEE Photonics Technology Letters, vol. 4, No. 3, Mar. 1992.

H. Toba et al., "A 100–Channel Optical FDM Six–Stage In–Line Amplifier System Employing Tunable Gain Equalizers" IEEE Photonics Technology Letters, vol. 5, No. 2, Feb. 1993.

H. Miyata et al., "Dispersion Compensation Design for 10–Gb/s 16–Wave WDM Transmission System Over Standard Single–Mode Fiber" Technical Report of IEICE, OCS95–34 (1995–07) (Translation of Abstract).

Y. Nakabayashi et al., "Er:Doped Fiber Amplifier for WDM Transmission Using Fiber Gain Control" Technical Report of IEICE, OCS94–66, OPE94–89 (1994–11) (Translation of Abstract).

M. Suyama et al., "2.5 Gb/s, 4 Channel WDM Transmission Over 1060 km Using EDFAs With Suppressed Gain Bandwidth Narrowing", OAA '93, pp. 126–129.

V.L. da Silva et al., "Automatic Gain Flattening in Er–Doped–Fiber Amplifiers" OFC/IOOC '93 Technical Digest, pp. 174–175.

T. Sugawa et al., "Optical Amplification in $Er^{3+}$–Doped Single–Mode Fluoride Fiber" IEEE Photonics Technology Letters, vol. 2, No. 7, Jul. 1990.

M. Shigematsu et al., "120 Channel AM–VSB Signal Transmission by 2 Wavelength Multiplexing Through Gain Flattened Hybrid Erbium–Doped Fiber Amplifier" OAA '95, ThB3–1, pp. 13–16.

C. R. Giles et al., "Dynamic Gain Equalization in Two Stage Fiber Amplifiers", IEEE Photonics Technology Letters, vol. 2, No. 12, Dec. 1990.

S. Yoshida et al., "Common Amplification Characteristics of EDFA With High Aluminium Concentration For Wavelength–Division–Multiplexed Signal" Technical Report of IEICE, CS95–43, OCS95–9 (1995–06).

T. Kashiwada et al. "Spectral Gain Behavior of Er–Doped Fiber With Extremely High Aluminum Concentration" OAA '93, pp. 104–107.

Chraplyvy et al., "Equalization in Amplified WDM Lightwave Transmission Systems," IEEE Photonics Tech. Letters, vol. 4, #8, pp. 920–922, Aug. 1992.

Desurvire, E., "Erbium–Doped Fiber Amplifier, Principles and Applications," publ. John Wiley & Sons, Inc., ISBN 0–471–58977–2; Fiber Amplifiers, pp. 480–487.

Kashiwada et al., OFC '95, vol. 8, Mar. 3, 1995, pp. 77–78.

Giles et al., "Dynamic Gain Equalizationin Two–Stage Fiber Amplifiers," IEEE Photonics Tech. Letters, vol. 2, #12, 12/90, pp. 866–869.

Hiromu Toba, et al.; "A 100–Channel Optical FDM Transmission/Distribution at 622 Mb/s over 50 km"; Journal of Lightwave Technology, vol. 8, No. 9, Sep. 1990; pp. 1396–1401.

* cited by examiner

MULTI-WAVELENGTH LIGHT AMPLIFIER

This application is a continuation of application Ser. No. 08/655,027, filed May 28, 1996, now U.S. Pat. No. 6,055,092.

BACKGROUND OF THE INVENTION

Field of the Invention

The present invention generally relates to a light amplifier for a wavelength division multiplexed (WDM) optical transmission system, and more particularly to a light amplifier having a two-stage configuration which eliminates a wavelength-dependence of the gain of the light amplifier.

Recently, an optical communications network has increasingly been used in practice. Nowadays, it is required that the optical communications network cope with multi-media networking. A WDM system is more attractive, particularly in terms of an increase in the transmission capacity. In order to realize the WDM system, it is necessary to use a multi-wavelength light amplifier capable of amplifying a wavelength division multiplexed signal. It is required that such a multi-wavelength light amplifier does not have wavelength-dependence of the gain, which is further required not to be changed due to a variation in the power of the input light.

A light amplifier is known which has an optical fiber doped with a rare-earth element and directly amplifies the input light. There has been some activity in the development of a multi-wavelength light amplifier which amplifies a wavelength division multiplexed light signal including signal components having different wavelengths (channels).

However, normally, the rare-earth-element doped fiber amplifier has a very narrow range in which the gain thereof does not have the wavelength-dependence. In this regard, nowadays, there is no available light amplifier which can practically be used for the WDM system. That is, there is no available light amplifier which does not have wavelength-dependence of the gain, which is not changed due to a variation in the power of the input light. Particularly, the wavelength-dependence of the gain, which takes place when the input power changes, deteriorates the signal-to-noise ratio with respect to a particular signal. This prevents the multi-wavelength light amplifier from being used in practice.

SUMMARY OF THE INVENTION

It is a general object of the present invention to provide a multi-wavelength light amplifier in which the above disadvantages are eliminated.

A more specific object of the present invention is to provide a multi-wavelength light amplifier which does not have wavelength-dependence of the gain, which is not changed due to a variation in the power of the input light.

The above objects of the present invention are achieved by a multi-wavelength light amplifier comprising: a first-stage light amplifier which has a first light amplifying optical fiber amplifying a light input; a second-stage light amplifier which has a second light amplifying optical fiber amplifying a first light output from the first-stage light amplifier; and an optical system which maintains a second light output of the second-stage light amplifier at a constant power level. The first-stage and second-stage light amplifiers have different gain vs wavelength characteristics so that the multi-wavelength light amplifier has no wavelength-dependence of a gain.

The above multi-wavelength light amplifier may be configured as follows. The first-stage light amplifier comprises a first pump source which pumps the first light amplifying optical fiber so as to have a first gain vs wavelength characteristic in which, as a wavelength of light to be amplified becomes shorter, a gain of the first-stage light amplifier becomes higher. The second-stage light amplifier comprises a second pump source which pumps the second light amplifying optical fiber so as to have a second gain vs wavelength characteristic in which, as a wavelength of light to be amplified becomes longer, a gain of the first-stage light amplifier becomes higher.

The above multi-wavelength light amplifier may be configured as follows. The first-stage light amplifier comprises a first pump source which pumps the first light amplifying optical fiber so as to have a first gain vs wavelength characteristic having a first linear gain slope. The second-stage light amplifier comprises a second pump source which pumps the second light amplifying optical fiber so as to have a second gain vs wavelength characteristic having a second linear gain slope. A combination of the first and second linear gain slopes results in a flat gain vs wavelength characteristic of the multi-wavelength light amplifier.

The above multi-wavelength light amplifier may further comprise an optical filter which emphasizes the gain vs wavelength characteristic of the first-stage light amplifier.

The above multi-wavelength light amplifier may further comprise an optical filter which compensates for a difference between the gain vs wavelength characteristics of the first-stage light amplifier and the second-stage light amplifier.

The above multi-wavelength light amplifier may be configured as follows. The optical filter is provided so as to follow the first-stage light amplifier. The first-stage light amplifier comprises a first pump source which pumps the first light amplifying optical fiber so as to have a first gain vs wavelength characteristic having a first linear gain slope. The second-stage light amplifier comprises a second pump source which pumps the second light amplifying optical fiber so as to have a second gain vs wavelength characteristic having a second linear gain slope. The optical filter emphasizes the first linear gain slope to provide an emphasized first linear gain slope. A combination of the emphasized first linear slope and the second linear gain slope results in a flat gain vs wavelength characteristic of the multi-wavelength light amplifier.

The above multi-wavelength light amplifier may be configured as follows. The optical filter is provided so as to follow the first-stage light amplifier. The first-stage light amplifier comprises a first pump source which pumps the first light amplifying optical fiber so as to have a first gain vs wavelength characteristic having a first linear gain slope. The second-stage light amplifier comprises a second pump source which pumps the second light amplifying optical fiber so as to have a second gain vs wavelength characteristic having a second linear gain slope. The optical filter compensates for the difference between the first and second linear gain slopes so that a flat gain vs wavelength characteristic of the multi-wavelength light amplifier can be obtained.

The above multi-wavelength light amplifier may be configured as follows. The first-stage light amplifier has a first AGC (automatic gain control) system so that a ratio of the input light and the first light output is constant. The second-stage light amplifier has a second AGC system so that a ratio of the first light output and the second light output is constant.

The above multi-wavelength light amplifier may be configured as follows. The first-stage light amplifier has an AGC (automatic gain control) system so that a ratio of the input light and the first light output is constant. The second-stage light amplifier has an automatic power control (APC) system so that the second light amplifying optical fiber is pumped at a predetermined constant power level.

The above multi-wavelength light amplifier may be configured as follows. The first-stage light amplifier has an AGC (automatic gain control) system so that a ratio of the input light and the first light output is constant. The second-stage light amplifier has an automatic level control (ALC) system so that the second light output is maintained at a predetermined constant power level.

The above multi-wavelength light amplifier may be configured as follows. The first AGC system comprises first means for detecting a first level of the light input and a second level of the first light output and pumping the first light amplifying optical fiber so that a ratio of the first and second levels is maintained at a first predetermined constant value. The second AGC system comprises second means for detecting a third level of the first light output and a fourth level of the second light output and pumping the second light amplifying optical fiber so that a ratio of the third and fourth levels is maintained at a second predetermined constant value.

The above multi-wavelength light amplifier may be configured as follows. The first-stage light amplifier has a first AGC (automatic gain control) system which detects a first amplified spontaneous emission of the first light amplifying optical fiber and pumps the first light amplifying optical fiber so that the first amplified spontaneous emission is maintained at a first predetermined constant level. The second-stage light amplifier has a second AGC system which detects a second amplified spontaneous emission of the second light amplifying optical fiber and pumps the second light amplifying optical fiber so that the second amplified spontaneous emission is maintained at a second predetermined constant level.

The above multi-wavelength light amplifier may be configured as follows. The first-stage light amplifier has a first-AGC (automatic gain control) system which detects a first pump light propagated through the first light amplifying optical fiber and pumps the first light amplifying optical fiber so that the first pump light is maintained at a first predetermined constant level. The second-stage light amplifier has a second AGC system which detects a second pump light propagated through the second light amplifying optical fiber and pumps the second light amplifying optical fiber so that the second pump light is maintained at a second predetermined constant level.

The above multi-wavelength light amplifier may be configured as follows. The first-stage light amplifier comprises a first pump source which pumps the first light amplifying optical fiber through a first coupler so as to have a first gain vs wavelength characteristic in which as a wavelength of light to be amplified becomes shorter, a gain of the first-stage light amplifier becomes higher. The second-stage light amplifier comprises a second pump source which pumps the second light amplifying optical fiber through a second coupler so as to have a second gain vs wavelength characteristic in which as a wavelength of light to be amplified becomes longer, a gain of the first-stage light amplifier becomes higher. At least one of the first and second couplers has a characteristic which emphasizes one of the gain vs wavelength characteristics of the first-stage and second-stage light amplifiers.

The above multi-wavelength light amplifier may be configured as follows. The optical system which maintains the second light output of the second-stage light amplifier at a constant power level comprises a variable attenuator which is provided between the first-stage light amplifier and the second-stage light amplifier and attenuates the first output signal on the basis of the power level of the second light output.

The above multi-wavelength light amplifier may be configured as follows. The optical system which maintains the second light output of the second-stage light amplifier at a constant power level comprises a variable attenuator which is provided so as to follow the second-stage light amplifier and attenuates the second output signal on the basis of the power level of an attenuated second light output from the variable attenuator.

The above multi-wavelength light amplifier may be configured as follows. The optical system which maintains the second light output of the second-stage light amplifier at a constant power level comprises a variable attenuator which is provided between the first-stage light amplifier and the second-stage light amplifier and attenuates the first output signal on the basis of the power level of an attenuated first light output from the variable attenuator.

The above multi-wavelength light amplifier may further comprise a rejection filter which is provided between the first-stage light amplifier and the second-stage light amplifier and prevents a pump light which pumps the first light amplifying optical fiber from being transmitted to the second-stage light amplifier.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
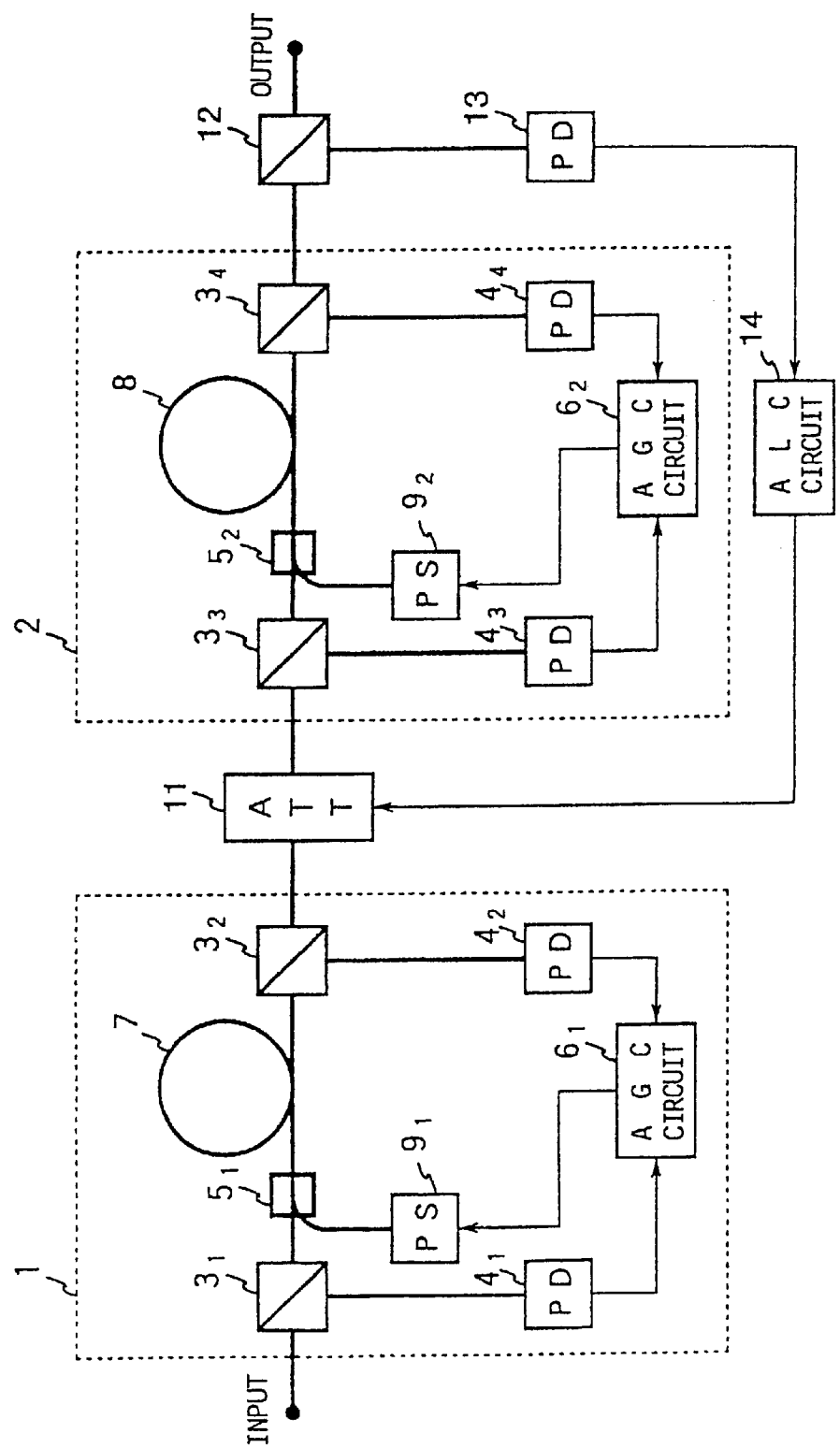
FIG. 1 is a block diagram of a multi-wavelength light amplifier according to a first embodiment of the present invention.

FIG. 1 is a block diagram of a multi-wavelength light amplifier according to a first embodiment of the present invention. The amplifier shown in FIG. 1 includes a first-stage (front-stage) light amplifier 1 and a second-stage (rear-stage) light amplifier 2. A variable attenuator (ATT) 11 is provided between the first and second amplifiers 1 and 2. The variable attenuator 11 is controlled by an automatic level control (ALC) circuit 14, which is controlled by a photodetector 13 such as a photodiode. The photodiode 13 receives split light from a beam splitting coupler 12, which follows the second-stage amplifier 2. An optical system having a feedback loop is formed by the light splitting coupler 12, the photodiode 13, the ALC circuit 14 and the variable attenuator 11.

The first-stage amplifier 1 includes a first-stage light input monitor made up of a beam splitting coupler $3_1$ and a photodiode $4_1$, and a first-stage light output monitor made up of a beam splitting coupler $3_2$ and a photodiode $4_2$. Further, the first-stage amplifier 1 includes a light amplifying optical fiber 7 such as a rare-earth-element doped optical fiber and an exciting-light source (hereinafter referred to as a pump source: PS) $9_1$, which is controlled by an automatic gain control (AGC) circuit $6_1$ provided in the first-stage amplifier 1. An AGC system including the AGC circuit $6_1$ and the above input and output monitors performs an AGC control of the pump source $9_1$ so that the ratio of the light input power level detected by the light input monitor and the light output power level detected by the light output monitor can be maintained at a constant value. The above ratio corresponds to the gain of the first-stage amplifier 1.

The second-stage amplifier 2 includes a second-stage light input monitor made up of a beam splitting coupler $3_3$ and a photodiode $4_3$, and a second-stage light output monitor made up of a beam splitting coupler $3_4$ and a photodiode $4_4$. Further, the second-stage amplifier 2 includes a light amplifying optical fiber 8 such as rare-earth-element doped optical fiber, and a pump source $9_2$, which is controlled by an AGC circuit $6_2$ provided in the second-stage amplifier 2. An AGC system including the AGC circuit $6_2$ and the above input and output monitors performs a AGC operation of the pump source $9_2$, so that the ratio of the light input power level detected by the light input monitor and the light output power level detected by the light output monitor can be maintained at a constant value.

The combination of the first-stage amplifier 1 and the second-stage amplifier 2 functions to cancel the difference between the gain of the amplifier 1 and the gain of the amplifier 2 in each of the wavelengths of the multiplexed signal. That is, the amplifiers 1 and 2 have different gain vs. wavelength characteristics (which may be simply referred to as gain characteristics), which can be compensated by the combination of the amplifiers 1 and 2. As a result, the entire multi-wavelength light amplifier has a flat gain vs wavelength characteristic.

It will now be assumed that $G_{0,1}$ denotes an AGC control setting level which causes the amplifier 1 to have a flat gain vs wavelength characteristic in which the output spectra at the respective wavelengths of the multiplexed signal have a constant peak value. Similarly, $G_{0,2}$ is denoted as an AGC control setting level which causes the amplifier 2 to have a flat gain vs wavelength characteristic in which the output spectra at the respective wavelengths of the multiplexed signal have a constant peak value. In order to achieve the above cancellation, the practical AGC control setting levels $G_1$ and $G_2$ of the amplifiers 1 and 2 are set so that $G_1 \geqq G_{0,1}$ and $G_2 \leqq G_{0,2}$. In this case, as will be described later with reference to FIG. 2, the amplifiers 1 and 2 can have gain vs wavelength characteristics that can be compensated by the combination thereof. For example, the gain of the amplifier 1 at a wavelength is large, while the gain of the amplifier 2 at the same wavelength as described above is small. Hence, the total gain obtained by the amplifiers 1 and 2 can be maintained at a constant (flat) level. By combining the two amplifiers together as described above, it is possible for the multi-wavelength light amplifier to have no waveform-dependence of the gain thereof.

The above waveform-dependence of the gain can be maintained at a constant level irrespective of a variation in the input power by the feedback loop including the light splitting coupler 12, the photodiode 13, the ALC circuit 14 and the variable attenuator 11. The split light from the beam splitting coupler 12 is applied to the photodiode 13, which generates an electric signal corresponding to the light level. The above electric signal is applied to the variable attenuator 11, and the amount of attenuation caused therein is varied on the basis of the light level detected by the photodiode 13. In this manner, the light output level of the second-stage amplifier 2 can be maintained at a constant level. The variable attenuator 11 may be formed by using a Faraday rotator or the electro-optical effect of a lithium niobate ($LiNbO_3$) crystal.

The amplifiers 1 and 2 are pumped forward by the pump sources $9_1$ and $9_2$. Alternatively, it is possible to pump the amplifiers 1 and 2 backward. It is also possible to pump the amplifiers 1 and 2 forward and backward.

The light amplifier shown in FIG. 1 is capable of amplifying all the wavelengths to be multiplexed so that the light amplifier does not have the wavelength-dependence of the gain, which is not changed due to a variation in the power of the input light. If some wavelengths are not used or only some wavelengths are used, a filter (not shown) having a corresponding wavelength characteristic may be placed before the photodiode $4_1$ ($4_3$) or $4_2$ ($4_4$) of the first-stage (second-stage) amplifier 1 (2) or both thereof.

Figure 2:
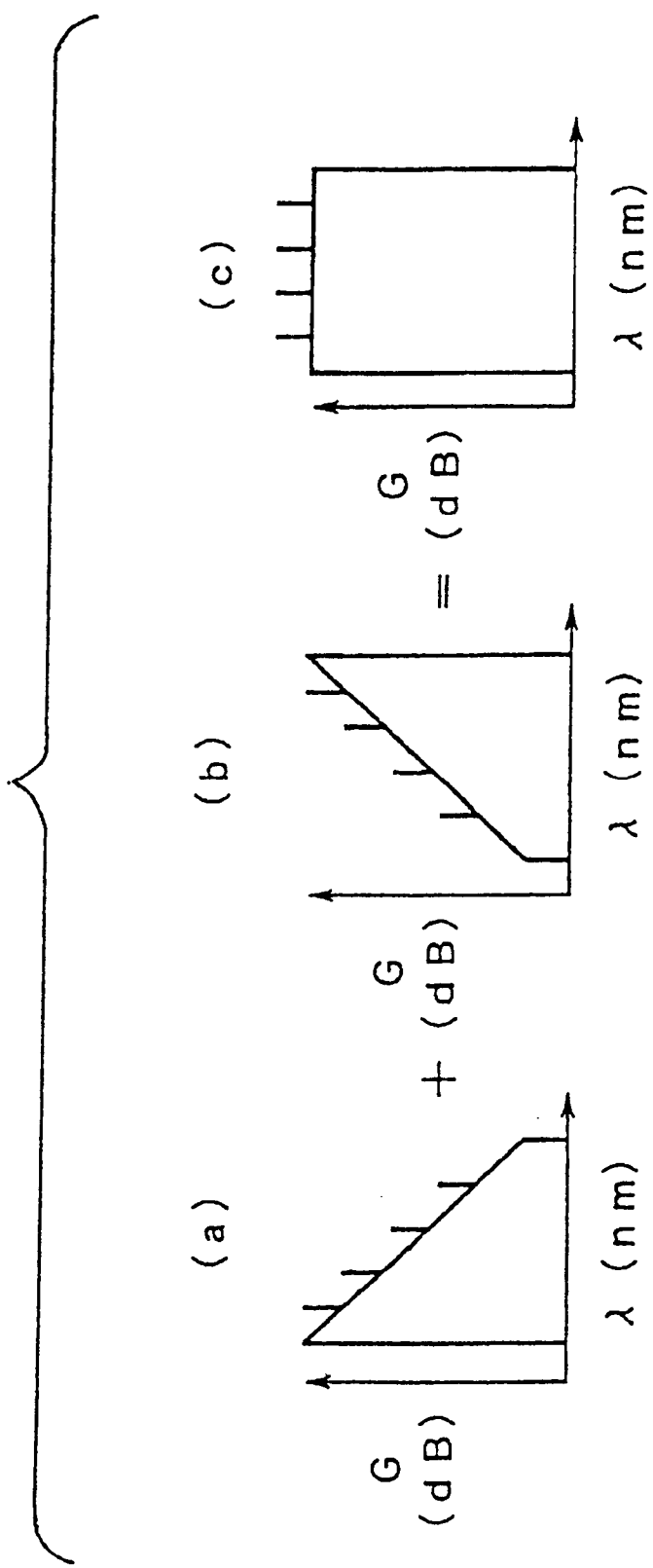
FIG. 2 is a-diagram showing a principle of a multi-wavelength light amplifier according to a second embodiment of the present invention.

FIG. 2 is a diagram of the operation of a multi-wavelength light amplifier according to a second embodiment of the present invention. The second embodiment has the same configuration as shown in FIG. 1. According to the second embodiment of the present invention, the optical fibers 7 and 8 are erbium-doped (Er-doped) optical fibers, which are examples of rare-earth-element doped optical fibers. Normally, alumina ($Al_2O_3$) is added to the Er-doped optical fibers at a high concentration level. In this regard, the Er-doped optical fiber may be called a co-doped optical fiber. The Er-doped optical fiber has a substantially linear gain vs wavelength characteristic in an amplifying band about 1550 nm, as shown in FIG. 2.

Part (a) of FIG. 2 shows a gain vs wavelength characteristic obtained in the amplifying band about 1550 nm when the exciting rate is relatively high, and part (b) of FIG. 2 shows a gain vs wavelength characteristic obtained in the amplifying band about 1550 nm when the exciting rate is relative low. The characteristics shown in parts (a) and (b) of FIG. 2-are due to the characteristics of absorption/emission of Er ions in the Er-doped optical fiber with alumina added thereto at a high concentration level. The horizontal axes of the parts (a), (b) and (c) of FIG. 2 denote the wavelength, and the vertical axes thereof denote the gain of the Er-doped optical fiber.

As shown in part (a) of FIG. 2, in the amplifying band about 1550 nm, the fiber has a relatively high gain on the short-wavelength side, and a relatively low gain on the long-wavelength side. In other words, as the wavelength becomes shorter, the gain becomes higher. As shown in part (b) of FIG. 2, in the amplifying band about 1550 nm, the fiber has a relatively high gain on the long-wavelength side, and a relatively low gain on the short-wavelength side. In other words, as the wavelength becomes longer, the gain becomes higher.

According to the second embodiment of the present invention, the Er-doped fiber 7 of the first amplifier 1 is long enough to increase the exciting rate and obtain the characteristic shown in part (a) of FIG. 2. The Er-doped fiber 8 of the second amplifier 1 is short enough to decrease the exciting rate and obtain the characteristic shown in part (b) of FIG. 2. Generally, when the pumping of the Er-doped fiber is increased, the gain vs wavelength characteristic is changed from part (b) of FIG. 2 to part (a) throughpart (c).

The linear gain slope characteristic of the first-stage amplifier 1 and that of the gain characteristic of the second-stage amplifier 2 are canceled by the combination of the amplifiers 1 and 2, so that a flat gain vs wavelength characteristic (a spectrum characteristic having a constant gain) as shown in part (c) of FIG. 2 can be obtained.

It is preferable for the first-stage amplifier 1 to be a low noise figure. In this regard, the Er-doped fiber 7 of the first-stage amplifier is used at a relatively high exciting rate. In this case, the exciting efficiency is not high. The Er-doped fiber 8 is used at a relatively low exciting rate. Hence, it is possible to improve the exciting efficiency of the second-stage amplifier 1. This contributes to reducing energy consumed in the second-stage amplifier 2.

The following data has been obtained through an experiment in which the multi-wavelength light amplifier was actually produced. The light amplifier produced in the experiment was designed to amplify four wavelengths (1548 nm, 1551 nm, 1554 nm, 1557 nm). The light input level used in the experiment was selected so as to fall within the range of $-25$ dBm through $-15$ dBm. The gain and the gain tilt of the first-stage amplifier 1 were respectively set to 20 dB and 1.5 dB at a maximum power of the exciting light equal to $-160$ mW (980 nm). The second-stage amplifier 2 was adjusted so as to produce, for each channel, the light output equal to $+7$ dBm at a maximum power of the exciting light equal to $-100$ mW (1480 nm). In this case, the multi-wavelength light amplifier has a maximum noise figure of 5.6 dB and a maximum gain tilt of 0.2 dB.

Figure 3:
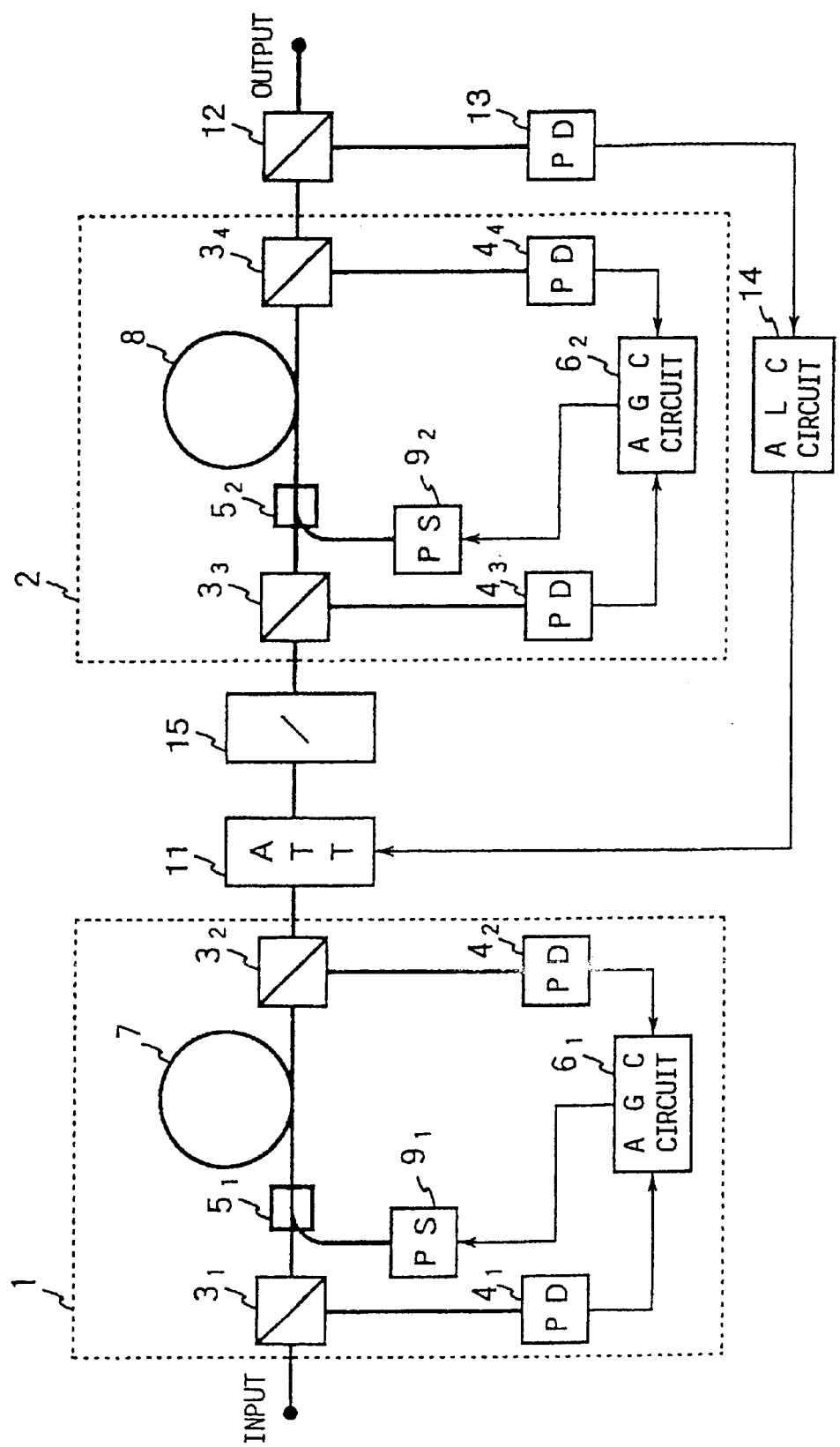
FIG. 3 is a block diagram of a multi-wavelength light amplifier according to a third embodiment of the present invention.

FIG. 3 is a block diagram of a multi-wavelength light amplifier according to a third embodiment of the present invention. In FIG. 3, parts that are the same as those shown in FIG. 1 are indicated by the same reference numbers. The light amplifier shown in FIG. 3 has an optical filter 15 for compensating for a wavelength characteristic, as will be described below. The optical filter 15 is provided between the variable attenuator 11 and the input side of the second-stage amplifier 2.

Figure 4:
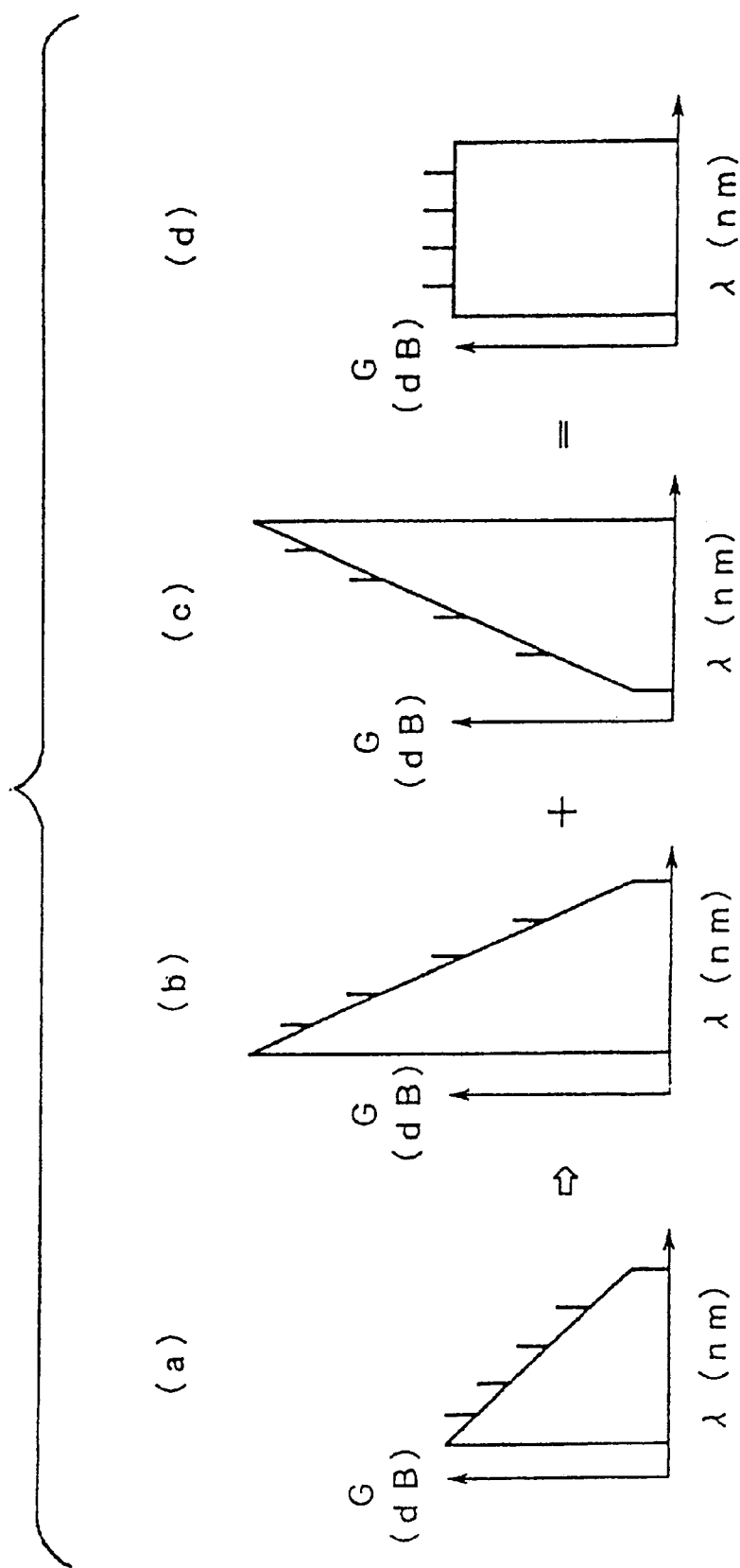
FIG. 4 is a diagram showing a principle of the multi-wavelength light amplifier according to the third embodiment of the present invention.

FIG. 4 is a diagram showing the operation of the light amplifier shown in FIG. 3. More particularly, part (a) of FIG. 4 shows a gain vs wavelength characteristic of the first-stage amplifier 1 shown in FIG. 3, and part (b) thereof shows a gain vs wavelength characteristic obtained by the combination of the first-stage amplifier 1 and the optical filter 15. Part (c) of FIG. 4 shows a gain vs wavelength characteristic of the second-stage amplifier 2 shown in FIG. 4, and part (d) shows a total gain vs wavelength characteristic of the whole light amplifier shown in FIG. 3.

The configuration of the first-stage amplifier 1 shown in FIG. 3 is the same as that of the amplifier 1 shown in FIG. 1. The configuration of the second-stage amplifier 2 shown in FIG. 3 is the same as that of the amplifier 2 shown in FIG. 1.

The optical filter 15 emphasizes the gain vs wavelength characteristic of the first-stage amplifier 1. As shown in parts (a) and (b) of FIG. 4, the gain for the short wavelengths is particularly emphasized. In other words, the linear gain slope of the characteristic shown in part (a) of FIG. 4 is increased by the optical filter 15. The characteristic of the second-stage amplifier 2 shown in part (c) of FIG. 4 compensates for the characteristic shown in part (b) thereof, so that the flat gain characteristic shown in part (d) of FIG. 4 can be finally obtained.

It will be noted that the exciting rate necessary to obtain the characteristic shown in part (c) of FIG. 4 is lower than that necessary to obtain the characteristic shown in part (b) of FIG. 2. In other words, the exciting efficiency of the characteristic shown in part (c) of FIG. 4 is higher than that of the characteristic shown in part (b) of FIG. 2. Hence, the second-stage amplifier 2 shown in FIG. 3 consumes a smaller amount of energy than that shown in FIG. 1. In other words, if the second-stage amplifier 2 shown in FIG. 3 consumes the same amount of energy as that shown in FIG. 1, the multi-wavelength light amplifier shown in FIG. 3 can output a larger amount of power than that shown in FIG. 1.

Since the first-stage amplifier 1 has the characteristic shown in part (a) of FIG. 4, it is a low noise figure. The characteristic of the first-stage amplifier 1 is emphasized by the optical filter 15, and the exciting efficiency thereof may be improved.

The variable attenuator 11 shown in FIG. 3 is controlled in the same manner as that shown in FIG. 1 as has been described previously. In short, the variable attenuator 11 maintains the level of the output light of the second-stage amplifier 1 at the predetermined constant level.

Figure 5:
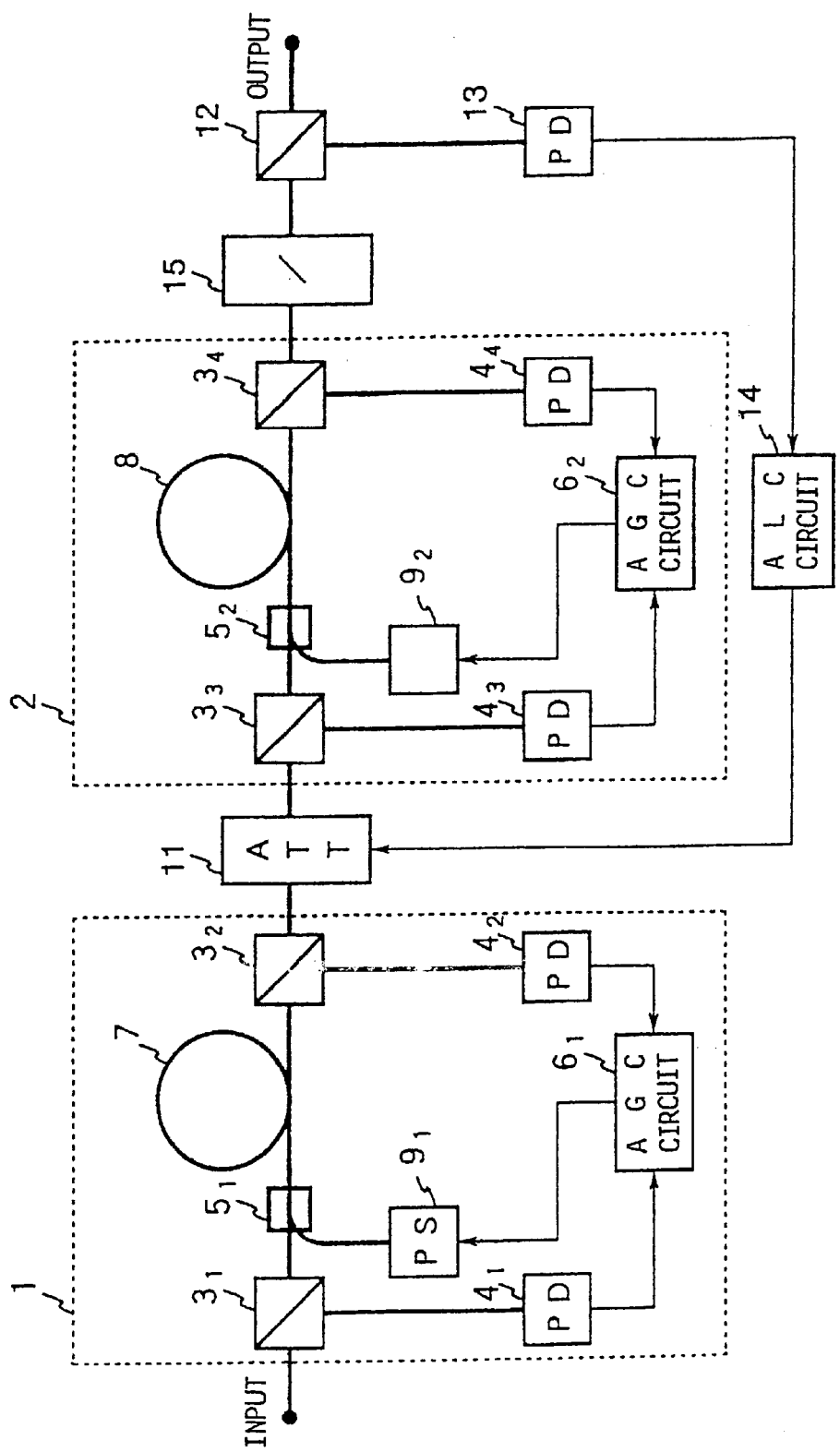
FIG. 5 is a block diagram of a multi-wavelength light amplifier according to a fourth embodiment of the present invention.

FIG. 5 is a block diagram of a multi-wavelength light amplifier according to a fourth embodiment of the present invention. In FIG. 5, parts that are the same as those shown in the previously described figures are given the same reference numbers. The configuration shown in FIG. 5 differs from that shown in FIG. 3 in that the optical filter 15 shown in FIG. 5 is provided between the output side of the second-stage amplifier 2 and the beam splitting coupler 12.

Figure 6:
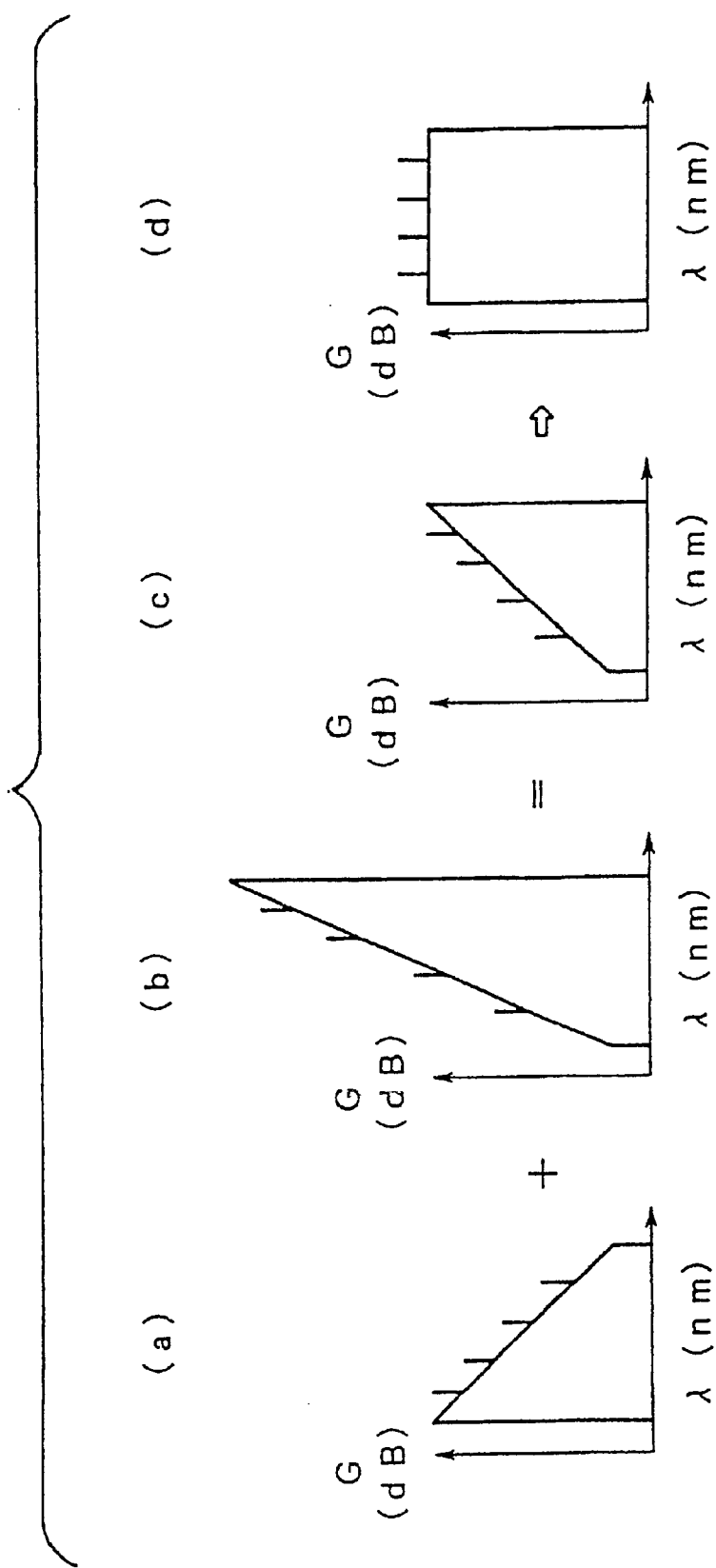
FIG. 6 is a diagram showing a principle of the multi-wavelength light amplifier according to the fourth embodiment of the present invention.

FIG. 6 is a diagram showing the operation of the light amplifier shown in FIG. 5. More particularly, part (a) of FIG. 6 shows a gain vs wavelength characteristic of the first-stage amplifier 1 shown in FIG. 5, and part (b) thereof shows a gain vs wavelength characteristic of the second-stage amplifier 2 shown in FIG. 5. Part (c) of FIG. 5 is a gain vs wavelength characteristic obtained by the combination of the first-stage amplifier 1 and the second-stage amplifier 2. Part (d) of FIG. 6 shows a total gain vs wavelength characteristic of the whole light amplifier shown in FIG. 5.

The configuration of the first-stage amplifier 1 shown in FIG. 5 is the same as that of the amplifier 1 shown in FIGS. 1 and 3. The configuration of the second-stage amplifier 2 shown in FIG. 5 is the same as that of the amplifier 2 shown in FIGS. 1 and 3.

The optical filter 15 has a gain vs wavelength characteristic which compensates for that shown in part (b) of FIG. 2. As shown in parts (a) and (b) of FIG. 6, the characteristic of the second-stage amplifier 2 is pumped so as to have an emphasized gain vs wavelength characteristic, as compared to that of the first-stage amplifier 1. In the emphasized characteristic, the gain for the long wavelengths is particularly emphasized. In other words, the linear gain slope of the characteristic shown in part (b) of FIG. 6 is greater than that shown in part (a) thereof although the linear gain slopes shown in parts (a) and (b) thereof are oriented in different directions. The combination of the first-stage amplifier 1 and the second-stage amplifier 2 results in the characteristic shown in part (c) of FIG. 6. It is not required that the first-stage amplifier 1 and the second-stage amplifier 2 have characteristics of such a difference which can be completely canceled by the combination thereof.

The optical filter 15 shown in FIG. 5 has a gain vs wavelength characteristic which compensates for the characteristic shown in part (c) of FIG. 6. Thus, the total characteristic is as shown in part (d) of FIG. 6.

It will be noted that the exciting rate necessary to obtain the characteristic shown in part (b) of FIG. 6 is lower than that necessary to obtain the characteristic shown in part (b) of FIG. 2. In other words, the exciting efficiency of the characteristic shown in part (b) of FIG. 6 is higher than that of the characteristic shown in part (b) of FIG. 2. Hence, the second-stage amplifier 2 shown in FIG. 5 consumes a smaller amount of energy than that shown in FIG. 1. In other words, if the second-stage amplifier 2 shown in FIG. 5 consumes the same amount of energy as that shown in FIG. 1, the multi-wavelength light amplifier shown in FIG. 5 can output a larger amount of power than that shown in FIG. 1.

The variable attenuator 11 shown in FIG. 5 is controlled in the same manner as that shown in FIG. 1 as has been described previously. In short, the variable attenuator 11 shown in FIG. 5 maintains the level of the output light of the second-stage amplifier 1 at the predetermined constant level.

The optical filter 15 used in FIG. 3 or FIG. 5 may be a conventional coupler of a melting attachment type. By adjusting the wavelength period of the coupler, it is possible to use the coupler as a gain tilting filter. For example, the optical filter 15 shown in FIG. 5 has a gain tilt equal to approximately 3 dB in order to obtain the flat gain characteristic shown in part (d) of FIG. 6.

Figure 7B:
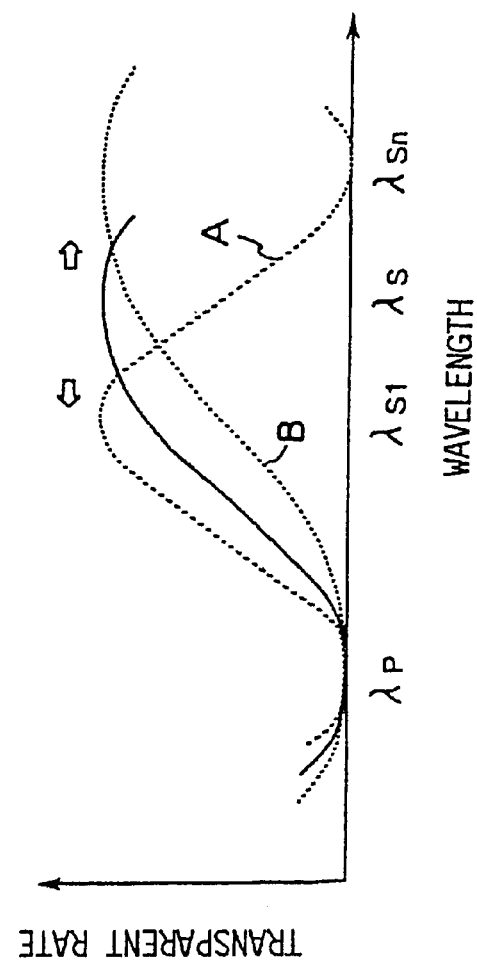
FIGS. 7A and 7B are diagrams showing a principle of a multi-wavelength light amplifier according to a fifth embodiment of the present invention.
Figure 7A:
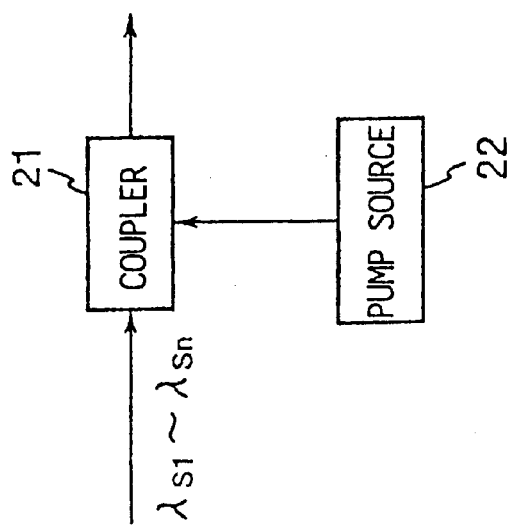

A description will now be given of a multi-wavelength light amplifier according to a fifth embodiment of the present invention. This embodiment is intended to obtain the same function as the configuration shown in FIG. 3 without the optical filter 15 shown therein. In other words, the light amplifier according to the fifth embodiment is configured as shown in FIG. 1, nevertheless it has the function of the light amplifier shown in FIG. 3, According to the fifth embodiment of the present invention, the beam splitting coupler $5_2$ is replaced by a beam splitting coupler 21 shown in FIG. 7A, which has a transparent rate vs wavelength characteristic as shown in FIG. 7B. In FIG. 7A, a pump source 22 which corresponds to the pump source $9_2$ is coupled to the beam splitting coupler 21. In FIG. 7B, symbol $\lambda_p$ denotes the wavelength of the pump light emitted from the source 22. Symbol $\lambda_s$ denotes the central wavelength of the multiplexed light signal. Symbols $\lambda_{s1}$ and $\lambda_{sn}$ are wavelengths which define the band of the multiplexed light signal. A solid line shown in FIG. 7B denotes a characteristic used for communications. Two dot lines are obtained by shifting the solid line. As indicated by the solid line, the beam splitting coupler 21 functions to pass the multiplexed signal light and prevent the pump light in the forward direction.

By shifting the solid line toward the short-wavelength side as indicated by character A in FIG. 7B, the characteristic curve of the transparent rate has a slope in the band defined by the wavelengths $\lambda_{s1}$ and $\lambda_{sn}$. In this case, the highest transparent rate can be obtained at the shortest wavelength $\lambda_{s1}$, and the lowest transparent rate can be obtained at the longest wavelength $\lambda_{sn}$. This characteristic corresponds to the characteristic of the optical filter 15 used in the configuration shown in FIG. 3. With the above configuration, the multi-wavelength light amplifier according to the fifth embodiment of the present invention has the same advantages as those of the light amplifier shown in FIG. 3.

The beam splitting coupler 21 can be applied to the first-stage amplifier 1 instead of the second-stage amplifier 2. In this case, the Er-doped optical fiber 7 of the first-stage amplifier 1 is pumped backward by the pump source 22 because the optical filter 15 shown in FIG. 3 is placed on the output side of the Er-doped optical fiber 7.

A description will now be given of a multi-wavelength light amplifier according to a sixth embodiment of the present invention. This embodiment is intended to obtain the same function as the configuration shown in FIG. 5 without the optical filter 15 shown therein. In other words, the light amplifier according to the sixth embodiment is configured as shown in FIG. 1, nevertheless it has the function of the light amplifier shown in FIG. 5.

In the sixth embodiment of the present invention, the pump source $9_2$ shown in FIG. 1 is replaced by the pump source 22 shown in FIG. 7A having the transparent rate characteristic indicated by B shown in FIG. 7B in such a way that the Er-doped optical fiber 8 is pumped backward by the pump source 22. This is because the optical filter 15 shown in FIG. 5 is placed on the output side of the Er-doped optical fiber 8 shown in FIG. 5.

By shifting the solid line shown in FIG. 7B toward the long-wavelength side as indicated by character B, the characteristic curve of the transparent rate has a slope in the band defined by the wavelengths $\lambda_{s1}$ and $\lambda_{sn}$. In this case, the highest transparent rate can be obtained at the longest wavelength 80 $_{sn}$, and the lowest transparent rate can be obtained at the shortest wavelength $\lambda_{s1}$. This characteristic corresponds to the characteristic of the optical filter 15 used in the configuration shown in FIG. 5. With the above configuration, the multi-wavelength light amplifier according to the sixth embodiment of the present invention has the same advantages as those of the light amplifier shown in FIG. 5.

It will be noted that the above-mentioned third through sixth embodiments of the present invention may be combined appropriately.

Figure 8:
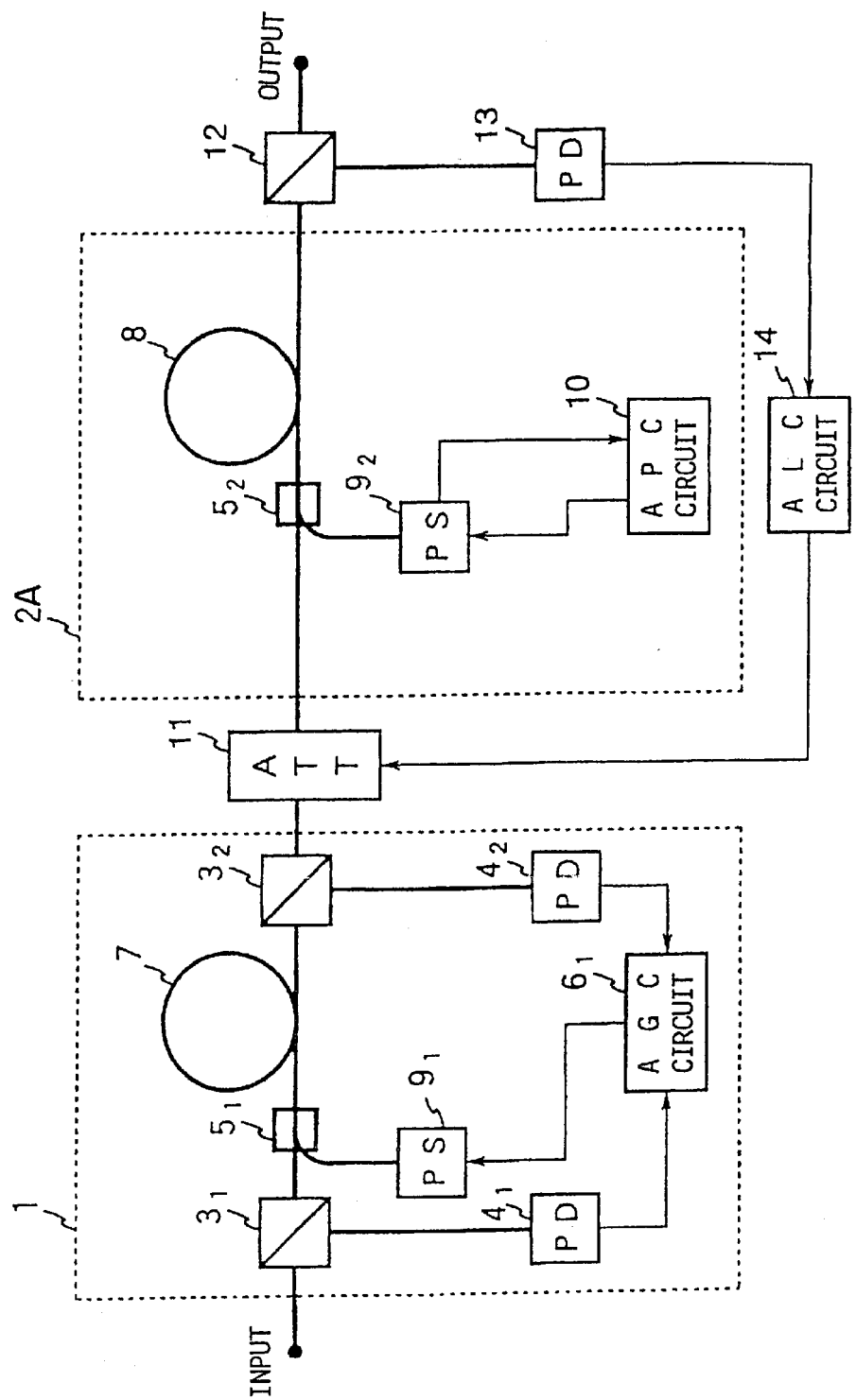
FIG. 8 is a block diagram of a multi-wavelength light amplifier according to a seventh embodiment of the present invention.

FIG. 8 is a multi-wavelength light amplifier according to a seventh embodiment of the present invention. In FIG. 8, parts that are the same as those shown in the previously described figures are given the same reference numbers. The light amplifier shown in FIG. 8 has a second-stage light amplifier 2A having a configuration different from the above-mentioned second-stage light amplifier 2.

More particularly, the second-stage amplifier 2A has an automatic power control (APC) circuit 10. The APC circuit 10 monitors and controls the pump light emitted from the pump source $9_2$, so that the pump light can be emitted at a predetermined constant level. As has been described previously, the variable attenuator 11 functions to maintain the amplified light output by the second-stage amplifier 2 at the predetermined constant level. Hence, even by the automatic power control of the pump light directed to maintaining the pump light at the constant level, it is possible to maintain the output light of the second-stage amplifier 2A at the predetermined constant level even if the power of the light input signal fluctuates.

The first-stage amplifier 1 shown in FIG. 8 has a gain vs wavelength characteristic as shown in part (a) of FIG. 2, and the second-stage amplifier 2A shown in FIG. 8 has a gain vs wavelength characteristic as shown in part (b) of FIG. 2.

The second-stage amplifier 2A does not need the couplers $3_3$ and $3_4$, and the photodiodes $4_3$ and $4_4$. Hence, the second-stage amplifier 2A is simpler than the second-stage amplifier 2, so that down-sizing of the light amplifier can be facilitated.

Figure 9:
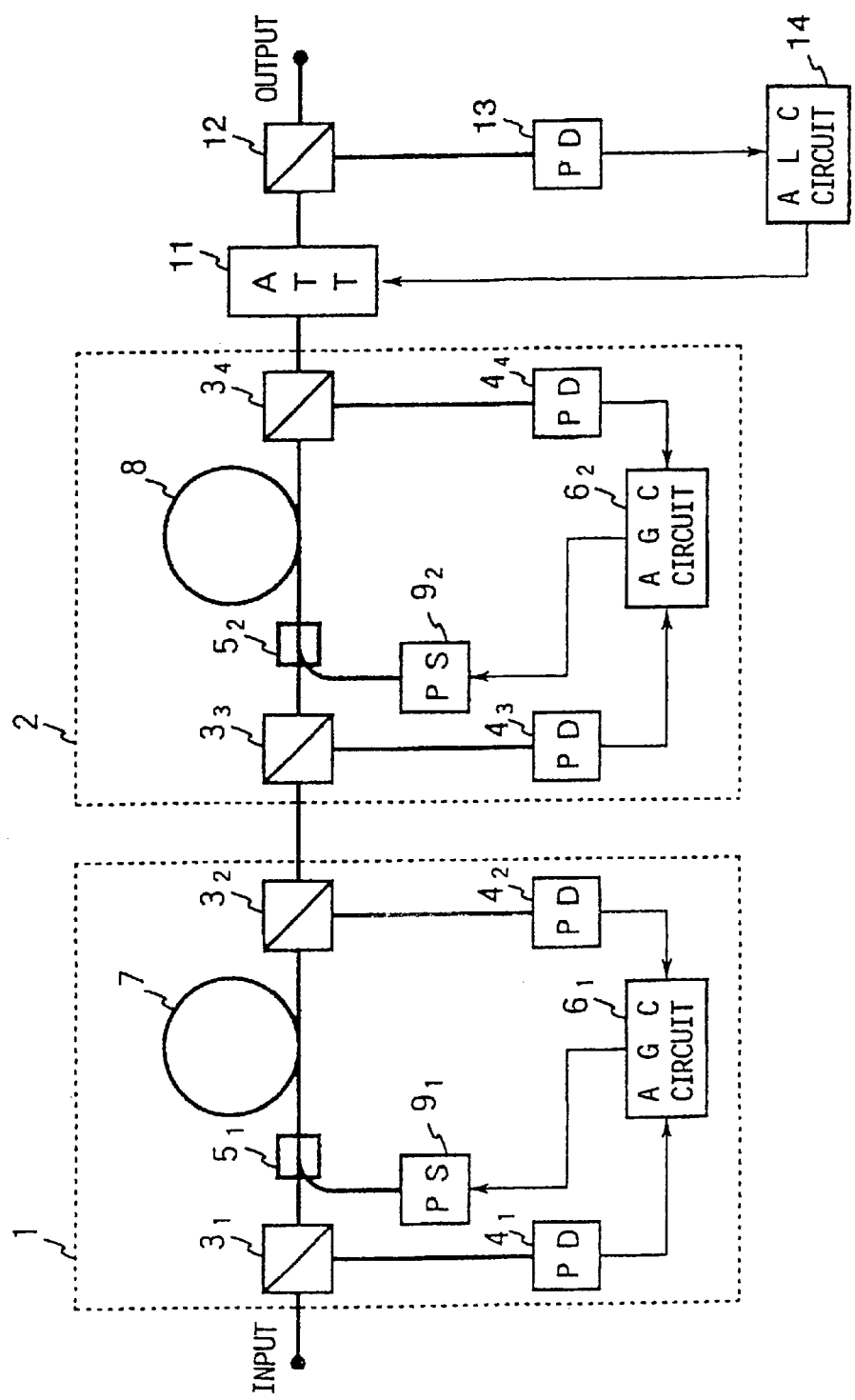
FIG. 9 is a block diagram of a multi-wavelength light amplifier according to an eighth embodiment of the present invention.

FIG. 9 is a block diagram of a multi-wavelength light amplifier according to an eighth embodiment of the present invention. In FIG. 9, parts that are the same as those shown in the previously described figures are given the same reference numbers. The configuration shown in FIG. 9 differs from the configuration shown in FIG. 1 in that the variable attenuator 11 shown in FIG. 9 is provided on the output side of the second-stage amplifier 2. Thus, the variable attenuator 11 attenuates the output light signal of the second-stage amplifier 2 so that it can be maintained at the predetermined constant level.

It will be noted that in the configuration shown in FIG. 1, the attenuated light signal from the variable attenuator 11 is amplified by the second-stage amplifier 2. On the other hand, in the configuration shown in FIG. 9, the variable attenuator 11 attenuates the light output signal of the second-stage amplifier 2. Hence, the second-stage amplifier 2 shown in FIG. 9 needs a much larger amount of energy of the pump light than that used in the configuration shown in FIG. 1. However, except for the above, the light amplifier shown in FIG. 9 has the same advantages as the configuration shown in FIG. 1. For example, the light amplifier shown in FIG. 9 has a low noise figure because an increase in loss of the gain does not occur between the first-stage amplifier 1 and the second-stage amplifier 2.

It will be noted that the first-stage and second-stage amplifiers 1 and 2 (2A) are not limited to the previously described AGC (APC) circuits in order to obtain the characteristics shown in FIGS. 2, 4 and 6. It is possible to arbitrarily combine the previously described AGC circuits. Further, it is also possible to employ other AGC circuits or equivalents thereof, which will be described below as ninth through eleventh embodiments of the present invention. It will be noted that the AGC circuit of the first-stage circuit can be selected separately from the AGC circuit of the second-stage circuit.

Figure 10:
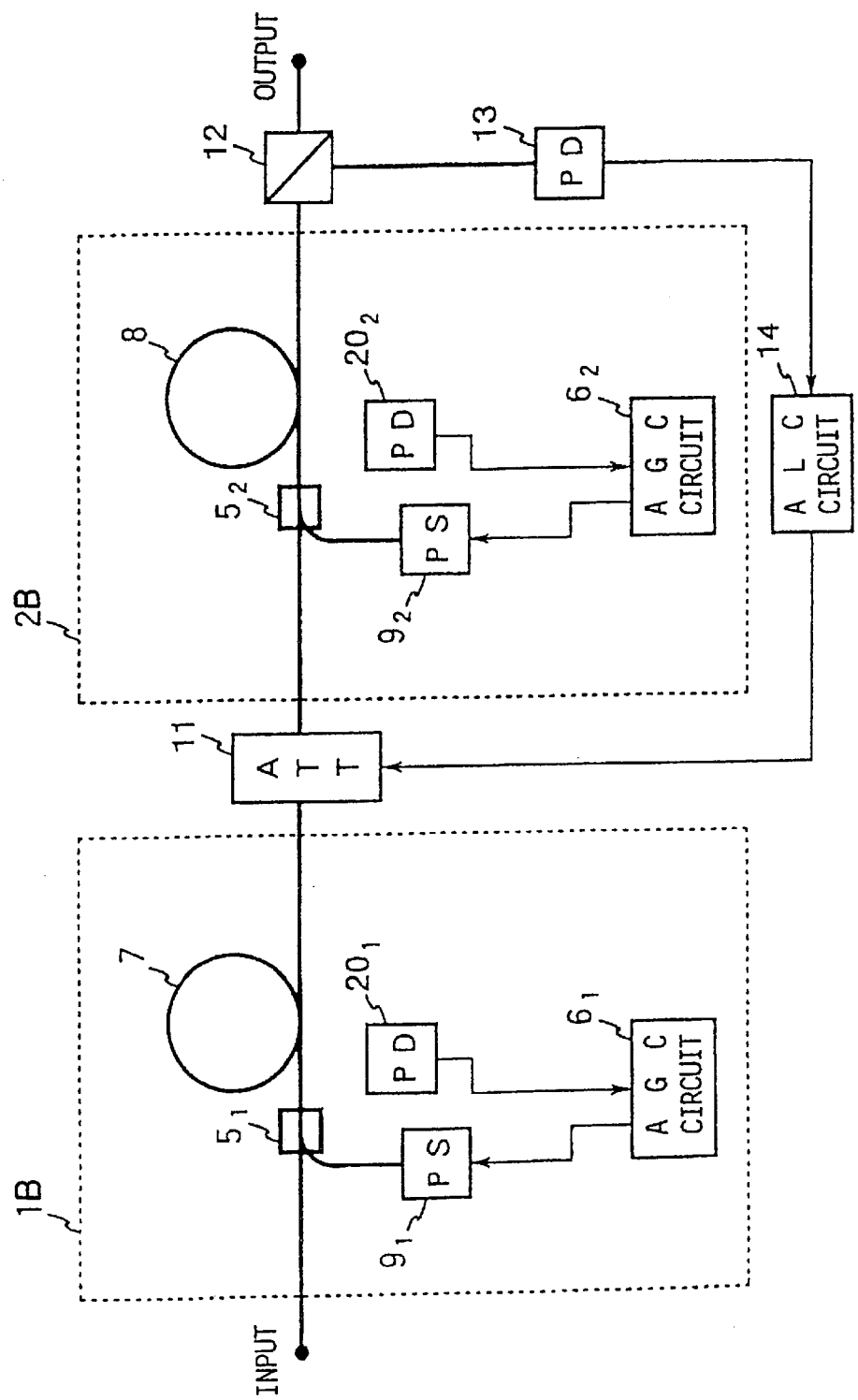
FIG. 10 is a block diagram of a multi-wavelength light amplifier according to a ninth embodiment of the present invention.

FIG. 10 is a block diagram of a multi-wavelength light amplifier according to a ninth embodiment of the present invention, wherein parts that are the same as those shown in FIG. 1 are given the same reference numbers. The light amplifier shown in FIG. 10 has a first-stage amplifier 1B and a second-stage amplifier 2B, which are different from the amplifiers 1 and 2.

The first-stage amplifier 1B, which has a gain vs wavelength characteristic as shown in part (a) of FIG. 2, has a forward-direction photodiode $20_1$, which detects a spontaneous emission (ASE) leaking from the side surface of the Er-doped optical fiber 7. The AGC circuit $6_1$ is supplied with the output signal of the photodiode $20_1$ and controls the pump power of the pump source $9_1$ so that the spontaneous emission can be maintained at a predetermined constant level. As a result of the AGC control, the gain of the front-stage amplifier 1B can be maintained at the predetermined constant value.

Similarly, the second-stage amplifier 2B, which has a gain vs wavelength characteristic as shown in part (b) of FIG. 2, has a forward-direction photodiode $20_2$, which detects the spontaneous emission leaking from a side surface of the Er-doped optical fiber 8. The AGC circuit $6_2$ is supplied with the output signal of the photodiode $20_2$ and controls the pump power of the pump source $9_2$ so that the spontaneous emission can be maintained at a predetermined constant level. As a result of the above AGC control, the gain of the second-stage amplifier 2B can be maintained at the predetermined constant level.

As has been described previously, the variable attenuator 11 provided between the first-stage amplifier 1B and the second-stage amplifier 2B functions to maintain the light output level at the predetermined constant level.

Figure 11:
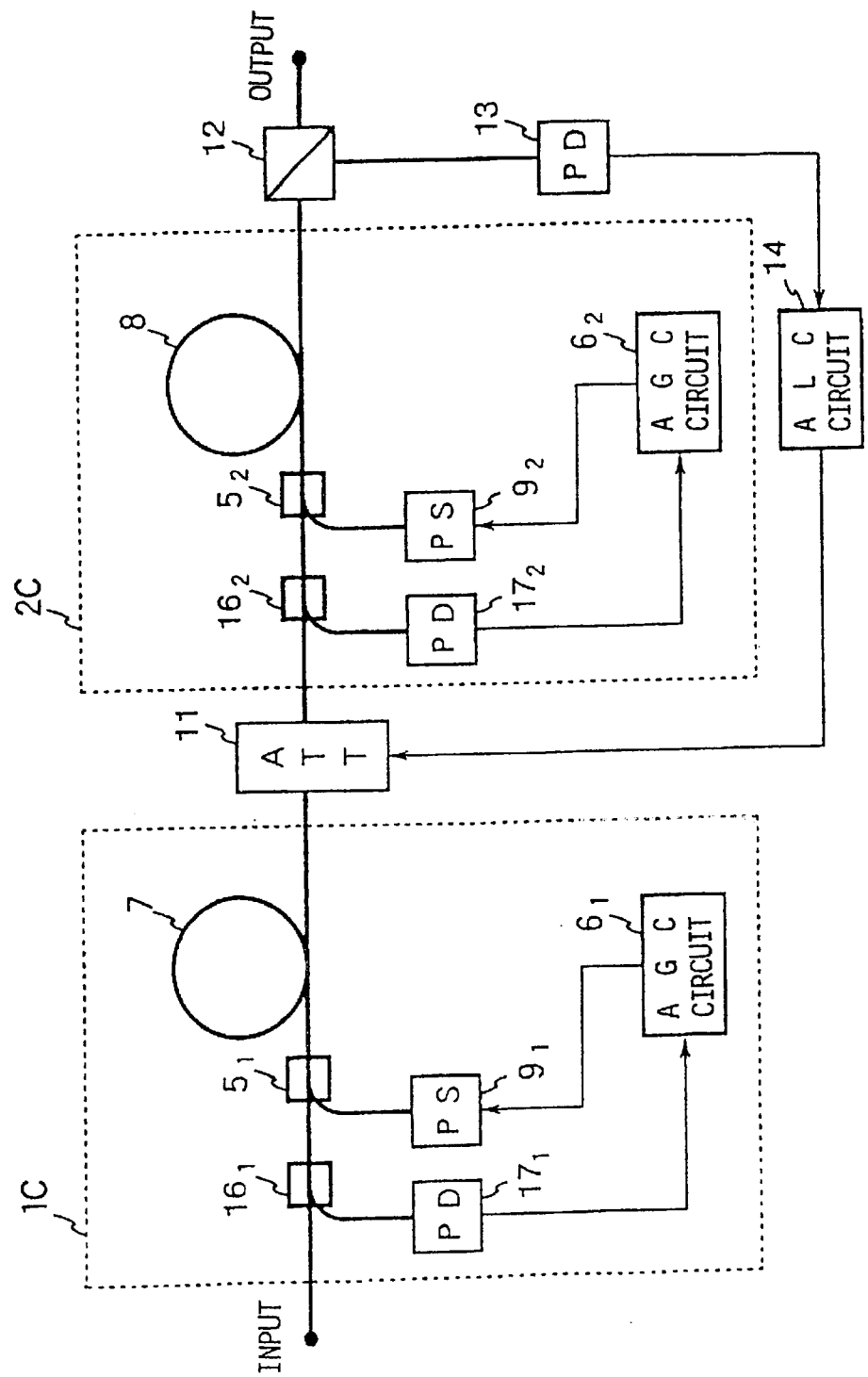
FIG. 11 is a block diagram of a multi-wavelength light amplifier according to a tenth embodiment of the present invention.

FIG. 11 is a block diagram of a multi-wavelength light amplifier according to a tenth embodiment of the present invention, in which parts that are the same as those shown in the previously described figures are given the same reference numbers. The light amplifier shown in FIG. 11 includes a first-stage light amplifier 1C and a second-stage light amplifier 2C.

The first-stage light amplifier 1C, which has a gain vs wavelength characteristic as shown in part (a) of FIG. 2, includes a WDM coupler $16_1$ and a photodiode $17_1$. The WDM coupler $16_1$ separates the light in the 1530 nm band (ASE) from the light in the 1550 nm band (signal light). The above ASE travels toward the input side of the Er-doped optical fiber 7 (backward ASE). The photodiode $17_1$ detects the amplified spontaneous emission of the Er-doped optical fiber 7. The AGC circuit $6_1$ receives the output signal of the photodiode $17_1$ and controls the pump power of the pump source $9_1$ so that the backward ASE can be maintained at a predetermined constant level. As a result of the above AGC control, the gain of the first-stage amplifier 1C can be maintained at the predetermined constant level.

The second-stage light amplifier 2C, which has a gain vs wavelength characteristic as shown in part (b) of FIG. 2, includes a WDM coupler $16_2$ and a photodiode $17_2$. The WDM coupler $16_1$ separates the light in the 1530 nm band (ASE) from the light in the 1550 nm band (signal light). The above ASE travels toward the input side of the Er-doped optical fiber 8 (backward ASE). The photodiode $17_2$ detects the amplified spontaneous emission of the Er-doped optical fiber 8. The AGC circuit $6_2$ receives the output signal of the photodiode $17_2$ and controls the pump power of the pump source $9_2$ so that the backward ASE can be maintained at a predetermined constant level. As a result of the above AGC control, the gain of the second-stage amplifier 2C can be maintained at the predetermined constant level.

As has been described previously, the variable attenuator 11 provided between the first-stage amplifier 1C and the second-stage amplifier 2C functions to maintain the light output level at the predetermined constant level.

Figure 12:
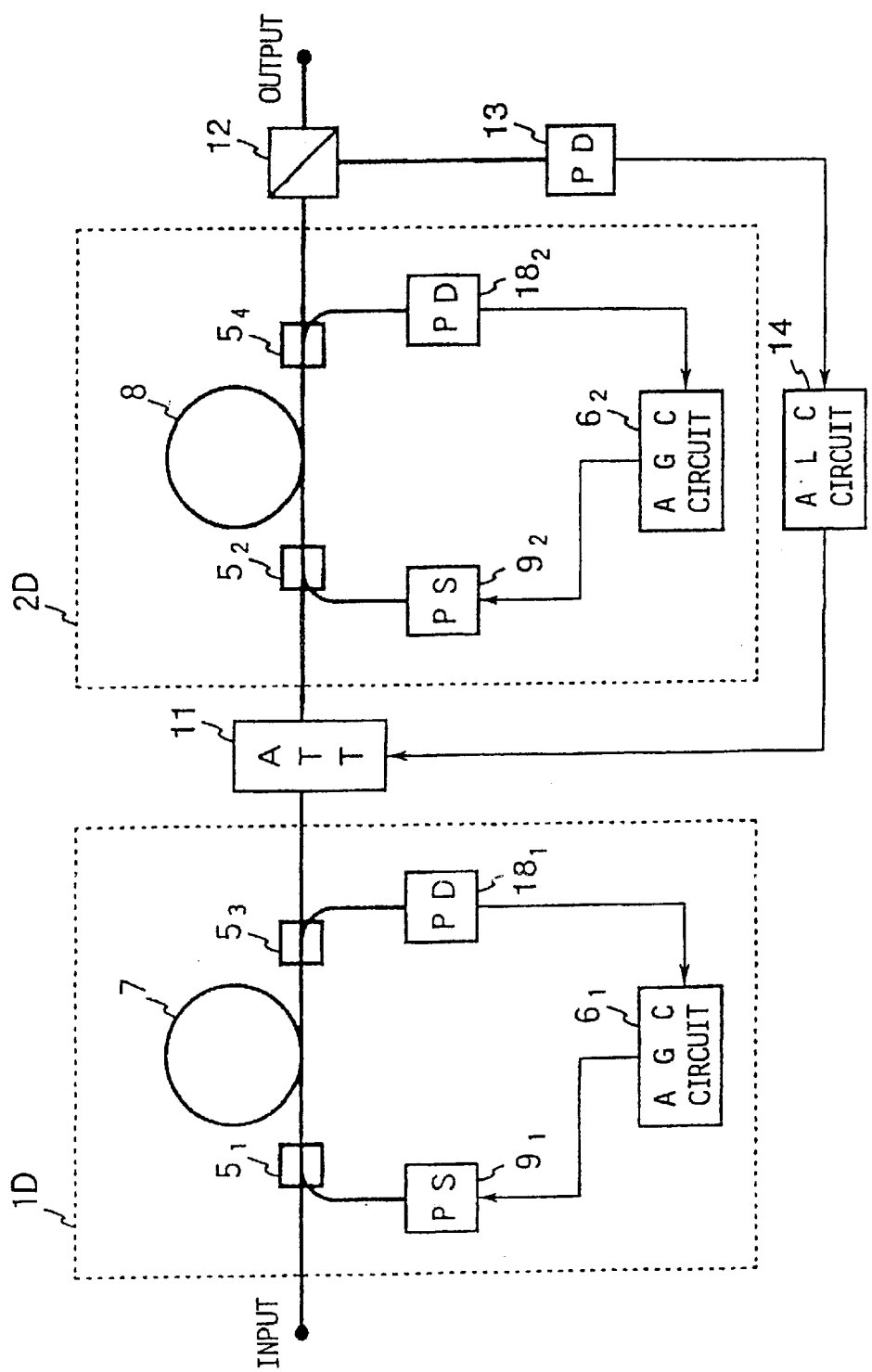
FIG. 12 is a block diagram of a multi-wavelength light amplifier according to an eleventh embodiment of the present invention.

FIG. 12 is a block diagram of a multi-wavelength light amplifier according to an eleventh embodiment of the present invention, in which parts that are the same as those shown in the previously described figures are given the same reference numbers. The light amplifier shown in FIG. 12 includes a first-stage light amplifier 1D and a second-stage light amplifier 2D.

The first-stage light amplifier 1D, which has a gain vs wavelength characteristic as shown in part (a) of FIG. 2, includes a WDM coupler $5_3$ and a photodiode $18_1$. The WDM coupler $5_3$ is provided on the output side of the Er-doped optical fiber 7, and separates the residual pump light (exciting light) propagated through the fiber 7 from the signal light. The residual pump light separated by the WDM coupler $5_3$ is applied to the photodiode $18_1$, which outputs a corresponding electric signal to the AGC circuit $6_1$. Then, the AGC circuit $6_1$ controls the pump power of the pump source $9_1$ on the basis of the detected residual pump light so that the residual pump light can be maintained at a predetermined constant level. As a result of the above AGC control, the gain of the first-stage amplifier 1D can be maintained at the predetermined constant level.

The second-stage light amplifier 2D, which has a gain vs wavelength characteristic as shown in part (b) of FIG. 2, includes a WDM coupler $5_4$ and a photodiode $18_2$. The WDM coupler $5_4$ is provided on the output side of the Er-doped optical fiber 8, and separates the residual pump light (exciting light) propagated through the fiber 8 from the signal light. The residual pump light separated by the WDM coupler $5_4$ is applied to the photodiode $18_2$, which outputs a corresponding electric signal to the AGC circuit $6_2$. Then, the AGC circuit $6_2$ controls the pump power of the pump source $9_2$ on the basis of the detected residual pump light so that the residual pump light can be maintained at a predetermined constant level. As a result of the above AGC control, the gain of the second-stage amplifier 2D can be maintained at the predetermined constant level.

As has been described previously, the variable attenuator 11 provided between the first-stage amplifier 1D and the second-stage amplifier 2D functions to maintain the light output level at the predetermined constant level.

Figure 13:
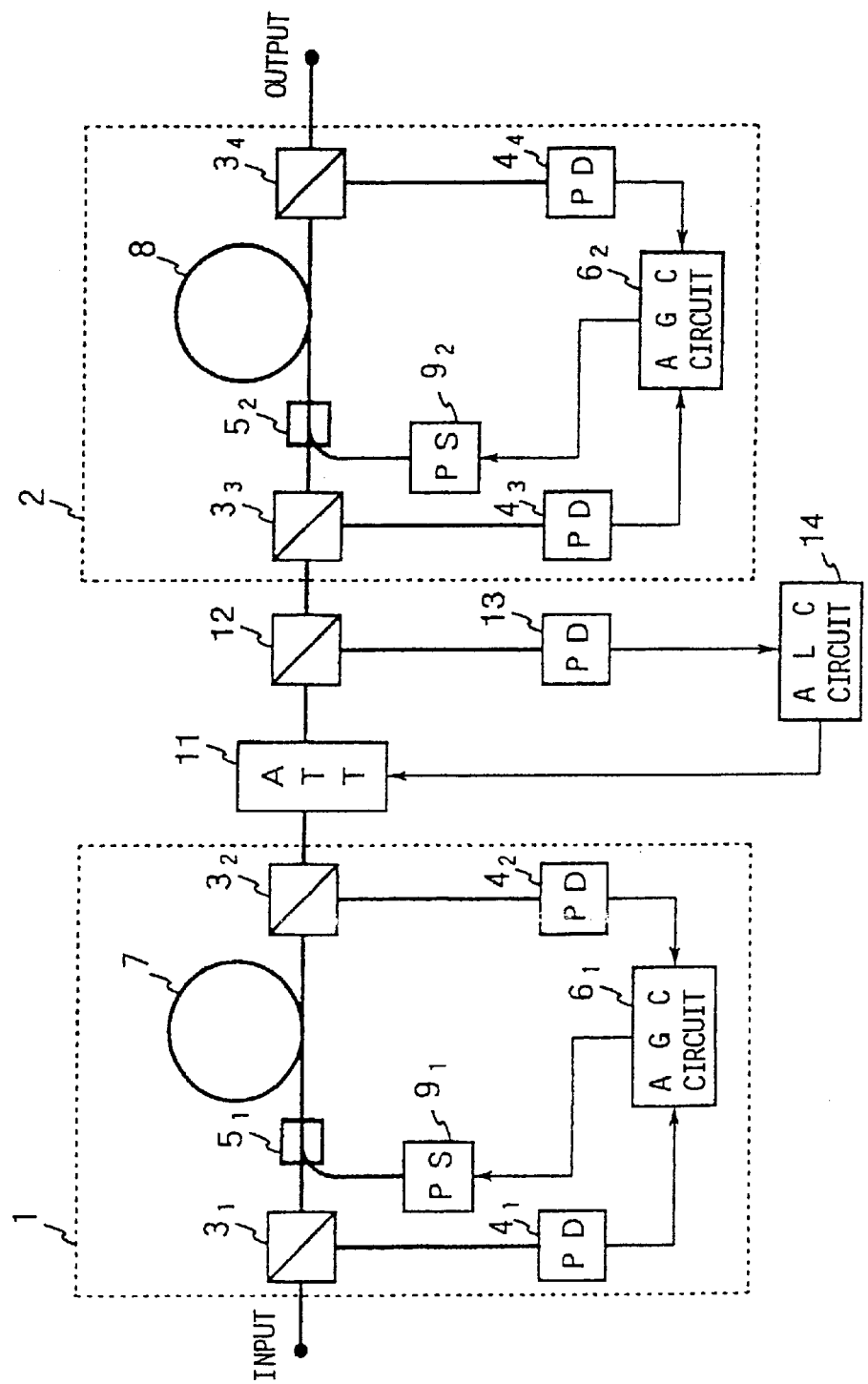
FIG. 13 is a block diagram of a multi-wavelength light amplifier according to a twelfth embodiment of the present invention.

FIG. 13 is a block diagram of a multi-wavelength light amplifier according to a twelfth embodiment of the present invention, wherein parts that are the same as those shown in the previously described figures are given the same reference numbers. The light amplifier shown in FIG. 13 differs from that shown in FIG. 1 in that the beam splitting coupler 12 is provided between the variable attenuator 11 and the second-stage amplifier 2.

It is possible to maintain the light output of the second-stage amplifier 2 at the predetermined constant level by controlling the variable attenuator 11 on the basis of the attenuated light output so that the attenuated light output is maintained at a predetermined constant level. In order to realize the above feedback control, the photodiode 13 detects a split component of the attenuated light output, and the ALC circuit 14 controls the variable attenuator 11 in the above-described manner.

Figure 14:
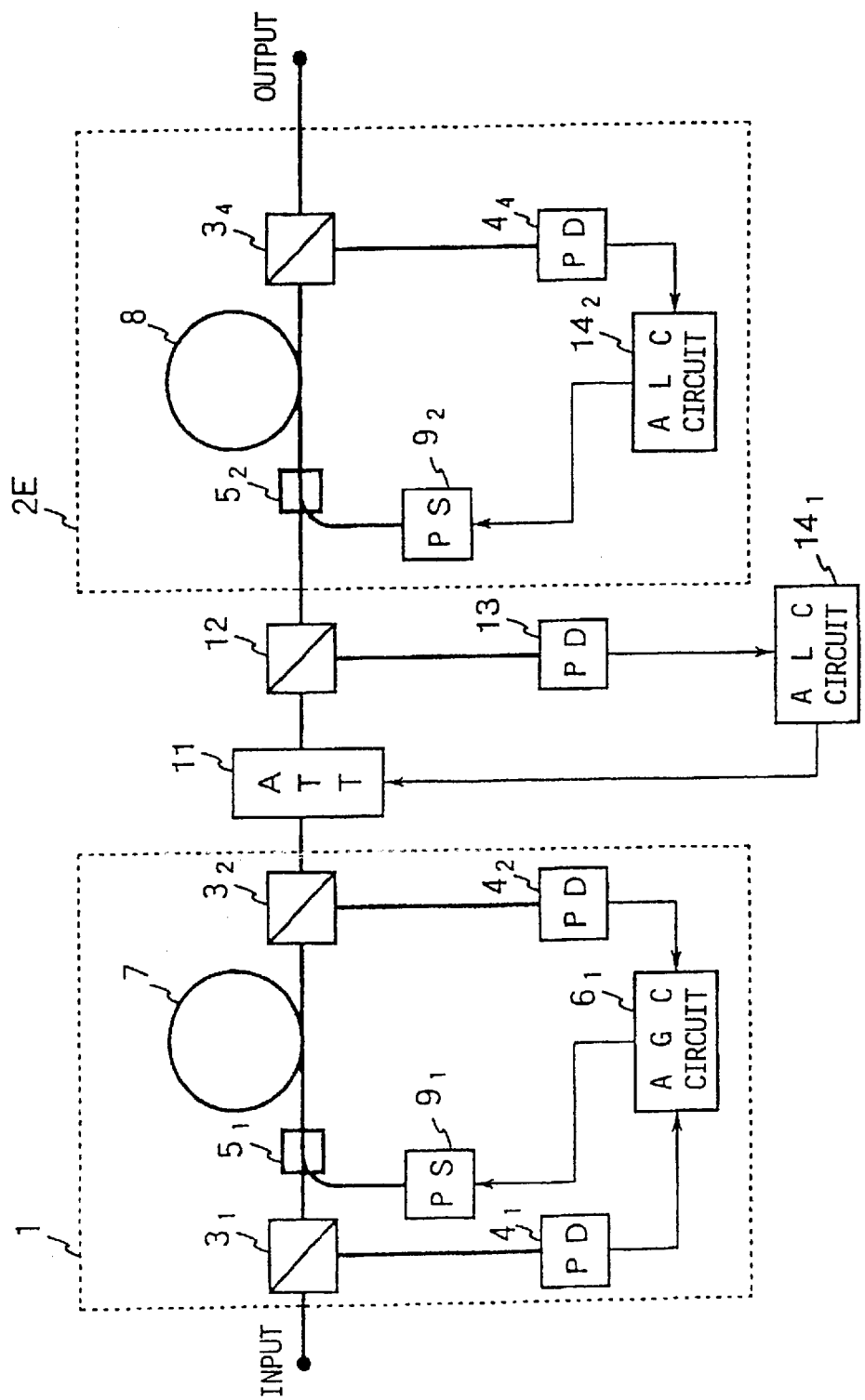
FIG. 14 is a block diagram of a multi-wavelength light amplifier according to a thirteenth embodiment of the present invention.

FIG. 14 is a block diagram of a multi-wavelength light amplifier according to a thirteenth embodiment of the present invention, in which parts that are the same as those shown in the previously described figures are given the same reference numbers. The light amplifier shown in FIG. 14 corresponds to a modification of the light amplifier shown in FIG. 13. The light amplifier shown in FIG. 14 has the first-stage light amplifier 1 and a second-stage light amplifier 2E.

The second-stage light amplifier 2E, which has a gain vs wavelength characteristic as shown in part (b) of FIG. 2, includes a beam splitting coupler $3_4$, the photodiode $4_4$ and an ALC circuit $14_2$. It will be noted that the second-stage amplifier 2E is simpler than the second-stage amplifier 2 shown in FIG. 13. As has been described previously with reference to FIG. 13, the attenuated light output is maintained at the predetermined constant level. Hence, the operation of the second-stage amplifier 2E receiving the attenuated light output through the beam splitting coupler 12 is equivalent to the AGC-controlled operation of the second-stage amplifier. Hence, it is possible to control the pump power of the pump source $9_2$ by the automatic level control performed by the ALC circuit $14_2$.

Figure 15:
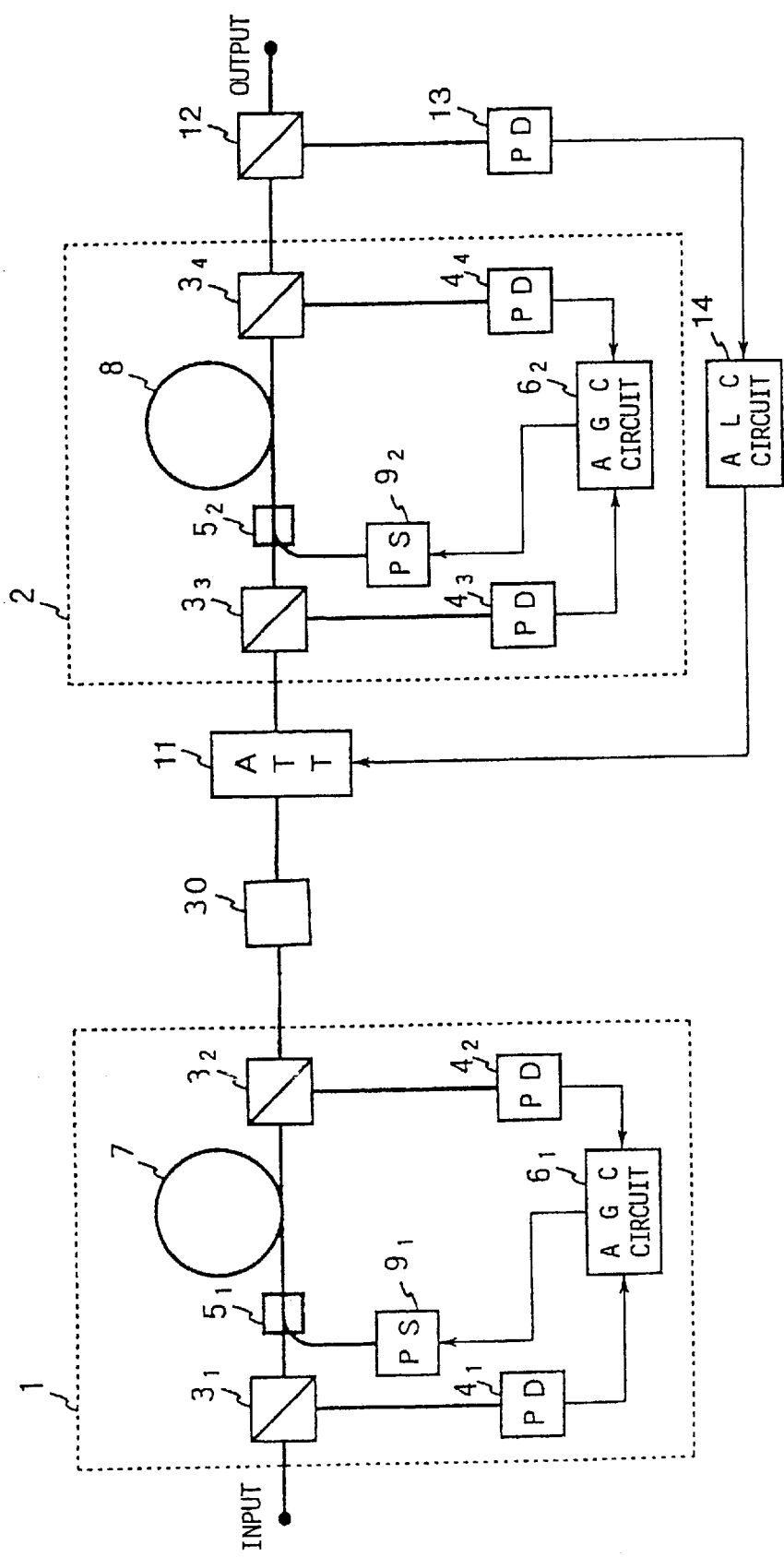
FIG. 15 is a block diagram of a multi-wavelength light amplifier according to a fourteenth embodiment of the present invention.

FIG. 15 shows a multi-wavelength light amplifier according to a fourteenth embodiment of the present invention. This amplifier includes a rejection filter 30 provided between the first-stage amplifier 1 and the second-stage amplifier 2. The rejection filter 30 prevents the noise light outside of the signal band propagated from the Er-doped optical fiber 7 from passing therethrough, and improves the exciting efficiency of the second-stage amplifier 2. The rejection filter 30 can be applied to the other embodiments of the present invention in the same manner as shown in FIG. 15.

The above-described embodiments of the present invention can be arbitrarily combined to provide variations and modifications.

The present invention is not limited to the specifically disclosed embodiments, and variations and modifications may be made without departing from the scope of the present invention.

What is claimed is:

1. An apparatus comprising:
   means for amplifying a wavelength division multiplexed (WDM) light including a plurality of wavelength division multiplexed optical signals at different wavelengths, said means including
      a first-stage optical amplifier which amplifies the WDM light to produce a first-stage amplified WDM light,
      a second-stage optical amplifier which amplifies the first-stage amplified WDM light to produce a second-stage amplified WDM light, and
      a level controller which controls a power level of the first-stage amplified WDM light to be input to the second-stage optical amplifier in accordance with a detected power level of the first-stage amplified WDM light or the second-stage amplified WDM light so that said means amplifies the WDM light with substantially equal gain over the wavelengths of the optical signals.

2. An apparatus as in claim 1, wherein the level controller comprises a variable optical attenuator controlling a power level of the first-stage amplified WDM light.

3. An apparatus as in claim 1, wherein the first-stage and second-stage optical amplifiers have different gain versus wavelength characteristics.

4. An apparatus as in claim 1, wherein the first-stage optical amplifier includes a first controller controlling a gain thereof based on power levels of the WDM light input to the first-stage optical amplifier and the first-stage amplified WDM light, and the second-stage optical amplifier includes a second controller controlling a gain thereof based on power levels of the first-stage amplified WDM light from the level controller and the second-stage amplified WDM light.

5. A method comprising:
   (a) optically amplifying a wavelength division multiplexed (WDM) light including a plurality of wavelength division multiplexed optical signals at different wavelengths, to produce an intermediate WDM light;
   (b) controlling a power level of the intermediate WDM light to produce a level controlled WDM light;
   (c) optically amplifying the level controlled WDM light to produce an amplified output WDM light; and
   (d) controlling said (a), (b) and (c) to produce the amplified output WDM light with substantially equal gain over the wavelengths of the optical signals,
   wherein the power level of the intermediate WDM light is controlled in accordance with a detected power level of the level controlled WDM light or the amplified output WDM light.

6. An apparatus for amplifying a wavelength division multiplexed (WDM) light including a plurality of wavelength division multiplexed optical signals at different wavelengths, the apparatus comprising:
   means for amplifying the WDM light with substantially equal gain over the wavelengths of the optical signals, said means including
      means for amplifying the WDM light to produce a first amplified WDM light,
      means for controlling a power level of the first amplified WDM light to produce a level controlled WDM light, and
      means for amplifying the level controlled WDM light and outputting an amplified WDM light,
      wherein said means for controlling controls the power level of the first amplified WDM light in accordance with a detected power level of the level controlled WDM light or the outputted amplified WDM light.

7. A method of amplifying a WDM optical signal including a plurality of optical signals having different wavelengths, comprising:
   optically amplifying the WDM optical signal with a first gain to produce a first-stage amplified WDM optical signal;
   attenuating the power level of the first-stage amplified WDM optical signal;
   optically amplifying the attenuated first-stage amplified WDM optical signal with a second gain to produce a second-stage amplified WDM optical signal;
   controlling an attenuation given to the first-stage amplified WDM optical signal, the first gain and the second gain in accordance with a detected power level of the attenuated first-stage amplified WDM optical signal or the second-stage amplified WDM optical signal, so that the second-stage amplified WDM optical signal includes the plurality of optical signals amplified with substantially equal gain; and
   outputting the second-stage amplified WDM optical signal.

8. A method as in claim 7, wherein said attenuating attenuates the power level of the first-stage amplified WDM optical signal to maintain a power level of the second-stage amplified WDM optical signal at a constant level.

9. An apparatus as in claim 1, wherein the level controller comprises an optical filter controlling gain versus wavelength characteristics of the first-stage amplified optical signal.

10. An apparatus as in claim 6, wherein the means for controlling comprises a variable optical attenuator.

11. An apparatus as in claim 6, wherein the means for controlling comprises an optical filter controlling gain versus wavelength characteristics of the first amplified optical signal.

12. An apparatus comprising:
   a means for amplifying a wavelength division multiplexed (WDM) light including a plurality of wavelength division multiplexed optical signals at different wavelengths, said means for amplifying including
      a first-stage optical amplifier which amplifies the WDM light to produce a first-stage amplified WDM light,
      controlling means for controlling a power level of the first-stage amplified WDM light to produce a level controlled WDM light, and
      a second-stage optical amplifier which amplifies the level controlled WDM light to produce a second-stage amplified WDM light,
      wherein said controlling means controls the power level of the first-stage amplified WDM light in accordance with a detected power level of the level controlled WDM light or the second-stage amplified WDM light and causes the WDM light to be amplified with substantially equal gain over the wavelengths of the optical signals.

13. An apparatus as in claim 12, wherein the level controller comprises a variable optical attenuator controlling a power level of the first-stage amplified WDM light.

14. An apparatus as in claim 12, wherein the level controller comprises an optical filter controlling gain versus wavelength characteristics of the first-stage amplified WDM light.

15. An apparatus as in claim 12, wherein the first-stage and second-stage optical amplifiers have different gain versus wavelength characteristics.

16. An apparatus as in claim 12, wherein the first-stage optical amplifier includes a first controller controlling a gain thereof based on power levels of the WDM light input to the first-stage optical amplifier and the first-stage amplified WDM light, and the second-stage optical amplifier includes a second controller controlling a gain thereof based on power levels of the level controlled WDM light and the second-stage amplified WDM light.

17. An apparatus comprising:
   a configuration to amplify a wavelength division multiplexed (WDM) light including a plurality of wavelength division multiplexed optical signals at different wavelengths, including
      a front-stage optical amplifier which amplifies the WDM light to produce a front-stage amplified WDM light,
      a controller which controls a power level of the front-stage amplified WDM light and outputs a controlled WDM light, and
      a rear-stage optical amplifier which amplifies the controlled WDM light to produce a rear-stage amplified WDM light,
      wherein the controller controls the power level of the front-stage amplified WDM light in accordance with a detected power level of the controlled WDM light or the rear-stage amplified WDM light and thereby causes the WDM light to be amplified by said configuration with substantially equal gain over the wavelengths of the optical signals.

18. An apparatus as in claim 17, wherein the level controller comprises a variable optical attenuator controlling a power level of the front-stage amplified WDM light.

19. An apparatus as in claim 17, wherein the level controller comprises an optical filter controlling gain versus wavelength characteristics of the front-stage amplified WDM light.

20. An apparatus as in claim 17, wherein the front-stage and rear-stage optical amplifiers have different gain versus wavelength characteristics.

21. An apparatus as in claim 17, wherein the front-stage optical amplifier includes a first controller controlling a gain thereof based on power levels of the WDM light input to the front-stage optical amplifier and the front-stage amplified WDM light, and the rear-stage optical amplifier includes a second controller controlling a gain thereof based on power levels of the controlled WDM light and the rear-stage amplified WDM light.

22. An apparatus comprising:
a configuration to amplify a WDM optical signal including a plurality of optical signals with different wavelengths, including
a first-stage optical amplifier which amplifies the WDM optical signal,
a controller which controls a power level of the WDM optical signal amplified by the first-stage optical amplifier in accordance with a detected power level of the WDM optical signal, and
a second-stage optical amplifier which amplifies the WDM optical signal of which level is controlled by the controller, wherein the controller causes the WDM optical signal to be amplified with substantially equal gain with respect to the wavelengths of the optical signals.

23. An apparatus as in claim 22, wherein the level controller comprises a variable optical attenuator controlling a power level of the WDM optical signal amplified by the first-stage optical amplifier.

24. An apparatus as in claim 22, wherein the level controller comprises an optical filter controlling gain versus wavelength characteristics of the WDM optical signal amplified by the first-stage optical amplifier.

25. An apparatus as in claim 22, wherein the first-stage and second-stage optical amplifiers have different gain versus wavelength characteristics.

26. An apparatus as in claim 22, wherein the first-stage optical amplifier includes a first controller controlling a gain thereof based on a power level of the WDM optical signal amplified by the first-stage optical amplifier, and the second-stage optical amplifier includes a second controller controlling a gain thereof based on a power level of the WDM optical signal amplified by the second-stage optical amplifier.

27. An optical amplifier comprising:
a first-stage optical amplifier which amplifies a WDM optical signal including a plurality of optical signals with different wavelengths,
a level controller which controls a power level of the WDM optical signal amplified by the first-stage optical amplifier in accordance with a detected power level of the WDM optical signal,
a second-stage optical amplifier which amplifies the WDM optical signal of which level is controlled by the level controller, and
a controller controlling the first-stage optical amplifier, the level controller and the second-stage optical amplifier to obtain the second-stage amplified WDM signal in which the plurality of optical signals are amplified with substantially equal gain.

28. An optical amplifier as in claim 27, wherein the level controller comprises a variable optical attenuator controlling a power level of the WDM optical signal amplified by the first-stage optical amplifier.

29. An optical amplifier as in claim 27, wherein the level controller comprises an optical filter controlling gain versus wavelength characteristics of the WDM optical signal amplified by the first-stage optical amplifier.

30. An optical amplifier as in claim 27, wherein the first-stage and second-stage optical amplifiers have different gain versus wavelength characteristics.

31. An optical amplifier as in claim 27, wherein the first-stage optical amplifier includes a first controller controlling a gain thereof based on a power level of the WDM optical signal amplified by the first-stage optical amplifier, and the second-stage optical amplifier includes a second controller controlling a gain thereof based on a power level of the WDM optical signal amplified by the second-stage optical amplifier.

32. An amplifier for amplifying a WDM optical signal including a plurality of optical signals having different wavelengths, comprising:
a first-stage optical amplifier which has an optical fiber for amplifying the WDM optical signal with a first gain, to produce a first-stage amplified WDM optical signal;
a level controller controlling the power level of the first-stage amplified WDM optical signal and outputting a level controlled WDM optical signal;
a second-stage optical amplifier which has an optical fiber for amplifying the level controlled WDM optical signal with a second gain, to produce a second-stage amplified WDM optical signal; and
a controller controlling the level controller, and the first and second gain, to obtain the second-stage amplified WDM signal in which the plurality of optical signals are amplified with substantially equal gain,
wherein the level controller controls the power level of the first-stage amplified WDM optical signal in accordance with a detected power level of the level controlled WDM optical signal or the second-stage amplified WDM optical signal.

33. An amplifier as in claim 32, wherein the level controller comprises an optical attenuator positioned between the first-stage optical amplifier and the second-stage optical amplifier.

34. An amplifier as in claim 32, wherein the level controller comprises an optical filter controlling gain versus wavelength characteristics of the first-stage amplified WDM optical amplified by the first-stage optical amplifier.

35. An amplifier as in claim 32, wherein the optical attenuator attenuates the power level of the first-stage amplified WDM optical signal, to control a power level of the second-stage amplified WDM optical signal.

36. An amplifier as in claim 32, wherein the optical attenuator attenuates the power level of the first-stage amplified WDM optical signal on the basis of the power level of the second-stage amplified optical signal.

37. An amplifier as in claim 32, wherein the first-stage and second-stage optical amplifiers have different gain versus wavelength characteristics so that the amplifier has a gain with substantially no wavelength-dependence.

38. An amplifier as in claim 32, wherein the level controller controls the power level of the first-stage amplified WDM optical signal to maintain the power level of the second-stage amplified WDM optical signal at a constant level.

39. An apparatus comprising:
a multi-stage optical amplifier including
a first-stage optical amplifier which has an optical fiber for amplifying a WDM optical signal including a plurality of optical signals having different wavelengths with a first gain, to produce a first-stage amplified WDM optical signal,
a level controller controlling the power level of the first-stage amplified WDM optical signal, to produce a level controlled WDM optical signal,
a second-stage optical amplifier which has an optical fiber for amplifying the level controlled WDM optical signal with a second gain, to produce a second-stage amplified WDM optical signal, and
means for controlling the level controller, the first gain and the second gain so that the plurality of optical signals are amplified with substantially equal gain.

40. An apparatus comprising:
a multi-stage optical amplifier comprising
a first-stage optical amplifier receiving a WDM optical signal including a plurality of optical signals with different wavelengths, and amplifying the received WDM optical signal,
a level controller controlling a power level of the WDM optical signal amplified by the first-stage optical amplifier,
a second-stage optical amplifier amplifying the WDM optical signal of which level is controlled by the level controller, and
a gain controller controlling the first-stage optical amplifier, the level controller and the second-stage optical amplifier to cause the plurality of optical signals to be amplified with substantially equal gain over the wavelengths of the optical signals, the gain being a gain of the WDM optical signal as amplified by second-stage optical amplifier with respect to the WDM optical signal as received by the first-stage optical amplifier.

41. An apparatus comprising:
a multi-stage optical amplifier comprising
a first-stage optical amplifier receiving a WDM optical signal including a plurality of optical signals with different wavelengths, and amplifying the received WDM optical signal,
a level controller controlling a power level of the WDM optical signal amplified by the first-stage optical amplifier,
a second-stage optical amplifier amplifying the WDM optical signal of which level is controlled by the level controller, and
means for controlling the first-stage optical amplifier, the level controller and the second-stage optical amplifier to cause the plurality of optical signals to be amplified with substantially equal gain over the wavelengths of the optical signals, the gain being a gain of the WDM optical signal as amplified by second-stage optical amplifier with respect to the WDM optical signal as received by the first-stage optical amplifier.

42. An apparatus for amplifying a wavelength division multiplexed (WDM) light including a plurality of wavelength division multiplexed optical signals at different wavelengths, the apparatus comprising:
means for amplifying the WDM light with substantially equal gain over the wavelengths of the optical signals, including
a first-stage optical amplifier which amplifies the WDM light to produce a first-stage amplified WDM light,
a second-stage optical amplifier which amplifies the first-stage amplified WDM light to produce a second-stage amplified WDM light, and
a level controller which controls a power level of the first-stage amplified WDM light to be input to the second-stage optical amplifier in accordance with a power level detected during transmission of the WDM light.

43. A method comprising:
(a) optically amplifying a wavelength division multiplexed (WDM) light including a plurality of wavelength division multiplexed optical signals at different wavelengths, to produce an intermediate WDM light;
(b) controlling a power level of the intermediate WDM light in accordance with a power level detected during transmission of the WDM light to produce a level controlled WDM light; and
(c) optically amplifying the level controlled WDM light to produce an amplified output WDM light, wherein said (a), (b) and (c) operate to amplify the WDM light with substantially equal gain over the wavelengths of the optical signals.

44. A method of amplifying a WDM optical signal including a plurality of optical signals having different wavelengths, comprising:
optically amplifying the WDM optical signal with a first gain to produce a first-stage amplified WDM optical signal;
attenuating the power level of the first-stage amplified WDM optical signal;
optically amplifying the attenuated first-stage amplified WDM optical signal with a second gain to produce a second-stage amplified WDM optical signal;
controlling an attenuation given to the power level of the first-stage amplified WDM signal in accordance with a power level detected during transmission of the WDM optical signal, and controlling the first gain and the second gain, so that the second-stage amplified WDM optical signal includes the plurality of optical signals amplified with substantially equal gain; and
outputting the second-stage amplified WDM optical signal.

45. An apparatus for amplifying a wavelength division multiplexed (WDM) light including a plurality of wavelength division multiplexed optical signals at different wavelengths, the apparatus comprising:
a configuration to amplify the WDM light with substantially equal gain over the wavelengths of the optical signals, the configuration including
a front-stage optical amplifier which amplifies the WDM light to produce a front-stage amplified WDM light,
a level controller which controls a power level of the front-stage amplified WDM light in accordance with a power level detected during transmission of the WDM light and outputs a controlled WDM light, and
a rear-stage optical amplifier which amplifies the controlled WDM light to produce rear-stage amplified WDM light.

46. An apparatus for amplifying a WDM optical signal including a plurality of optical signals with different wavelengths, comprising:
a configuration for amplifying the WDM optical signal with substantially equal gain with respect to the wavelengths of the optical signals, the configuration including a first-stage optical amplifier which amplifies the WDM optical signal, a level controller which controls a power level of the WDM optical signal amplified by the first-stage optical amplifier in accordance with a power level detected during transmission of the WDM optical signal, and a second-stage optical amplifier which amplifies the WDM optical signal of which level is controlled by the level controller.

47. An optical amplifier comprising:

a first-stage optical amplifier which amplifies a WDM optical signal including a plurality of optical signals with different wavelengths, a level controller which controls a power level of the WDM optical signal amplified by the first-stage optical amplifier in accordance with a power level detected during transmission of the WDM optical signal, a second-stage optical amplifier which amplifies the WDM optical signal of which level is controlled by the level controller, and a gain controller controlling the first-stage optical amplifier, the level controller and the second-stage optical amplifier to obtain the second-stage amplified WDM signal in which the plurality of optical signals are amplified with substantially equal gain.

48. An amplifier for amplifying a WDM optical signal including a plurality of optical signals having different wavelengths, comprising:

a first-stage optical amplifier which has an optical fiber for amplifying the WDM optical signal with a first gain, to produce a first-stage amplified WDM optical signal;

a level controller controlling the power level of the first-stage amplified WDM optical signal in accordance with a power level detected during transmission of the WDM optical signal and outputting a level controlled WDM optical signal;

a second-stage optical amplifier which has an optical fiber for amplifying the level controlled WDM optical signal with a second gain, to produce a second-stage amplified WDM optical signal; and a gain controller controlling the level controller, and the first and second gain, to obtain the second-stage amplified WDM signal in which the plurality of optical signals are amplified with substantially equal gain.

49. An apparatus comprising:

a multi-stage optical amplifier including a first-stage optical amplifier which has an optical fiber for amplifying a WDM optical signal including a plurality of optical signals having different wavelengths with a first gain, to produce a first-stage amplified WDM optical signal, a level controller controlling the power level of the first-stage amplified WDM optical signal in accordance with a power level detected during transmission of the WDM optical signal, to produce a level controlled WDM optical signal, and a second-stage optical amplifier which has an optical fiber for amplifying the level controlled WDM optical signal with a second gain, to produce a second-stage amplified WDM optical signal, wherein the level controller controls the power level of the first-stage amplified WDM optical signal, and the first gain and the second gain are controlled, so that the multi-stage optical amplifier amplifies the plurality of optical signals with substantially equal gain.

50. An apparatus comprising:

a multi-stage optical amplifier comprising a first-stage optical amplifier receiving a WDM optical signal including a plurality of optical signals with different wavelengths, and amplifying the received WDM optical signal, a level controller controlling a power level of the WDM optical signal amplified by the first-stage optical amplifier in accordance with a power level detected during transmission of the WDM optical signal, a second-stage optical amplifier amplifying the WDM optical signal of which level is controlled by the level controller, and a gain controller controlling the first-stage optical amplifier, the level controller and the second-stage optical amplifier to cause the plurality of optical signals to be amplified with substantially equal gain over the wavelengths of the optical signals, the gain being a gain of the WDM optical signal as amplified by second-stage optical amplifier with respect to the WDM optical signal as received by the first-stage optical amplifier.

51. An apparatus comprising:

a multi-stage optical amplifier comprising a first-stage optical amplifier receiving a WDM optical signal including a plurality of optical signals with different wavelengths, and amplifying the received WDM optical signal, a level controller controlling a power level of the WDM optical signal amplified by the first-stage optical amplifier in accordance with a power level detected during transmission of the WDM optical signal, a second-stage optical amplifier amplifying the WDM optical signal of which level is controlled by the level controller, and means for controlling the first-stage optical amplifier, the level controller and the second-stage optical amplifier to cause the plurality of optical signals to be amplified with substantially equal gain over the wavelengths of the optical signals, the gain being a gain of the WDM optical signal as amplified by second-stage optical amplifier with respect to the WDM optical signal as received by the first-stage optical amplifier.

* * * * *

UNITED STATES PATENT AND TRADEMARK OFFICE
CERTIFICATE OF CORRECTION

PATENT NO.   : 6,369,938 B1
DATED        : April 9, 2002
INVENTOR(S)  : Yasushi Sugaya et al.

It is certified that error appears in the above-identified patent and that said Letters Patent is hereby corrected as shown below:

<u>Title page,</u>
Item [56] References Cited, U.S. PATENT DOCUMENTS, please list the following references:
--   5,140,456   08/1992   Huber
     5,185,826   02/1993   Delavaux
     5,218,608   06/1993   Aoki
     5,287,216   02/1994   Chirravuri et al.
     5,541,766   07/1996   Mizrahi et al.
     5,764,404   06/1998   Yamane et al.
     5,510,926   04/1996   Bayart et al.
     5,812,710   09/1998   Sugaya
     5,537,244   07/1996   Fukushima, et al. --
FOREIGN PATENT DOCUMENTS, please list the following references:
--   EP   0 439 867 B1   06/1994   Europe
     JP   4-149525       05/1992   Japan --
OTHER PUBLICATIONS, please list the following references:

Hiroo KANAMORI; "OPTICAL COMPONENTS AND FIBER TECHNOLOGIES FOR ERBIUM-DOPED FIBER AMPLIFIER", Fourth Optoelectronics Conference (OEC '92) Technical Digest 1992.

M. HAMADA et al.; "CHARACTERISTICS OF FUSION SPLICE OF $Er^{3+}$-DOPED FIBER FOR OPTICAL AMPLIFIER", Fourth Optoelectronics Conference (OEC '92) Technical Digest 1992.

C. R. Giles et al.; "DYNAMIC GAIN EQUALIZATION IN TWO-STAGE FIBER AMPLIFIERS";Optical Amplifiers and Their Applications; Technical Digest 1990, Series Volume 13, MD2 48-51.

T. Kakinuma et al.; "GAIN AND NOISE CHARACTERISTICS OF ER-DOPED FIBER AMPLIFIERS WITH DIFFERENT PUMPING DIRECTIONS"; Optical Amplifiers and Their Applications; Technical Digest 1990, Series Volume 13, TuBl 126 - 129.

UNITED STATES PATENT AND TRADEMARK OFFICE
CERTIFICATE OF CORRECTION

PATENT NO. : 6,369,938 B1
DATED : April 9, 2002
INVENTOR(S) : Yasushi Sugaya et al.

It is certified that error appears in the above-identified patent and that said Letters Patent is hereby corrected as shown below:

M. YOSHIDA et al.; "DEVELOPMENT OF COMPACT CHARACTERISTIC OF $Er^{3+}$-DOPED FIBER AMPLIFIERS FOR PRACTICAL APPLICATIONS"; Optical Amplifiers and Their Applications; Technical Digest 1990, Series Volume 13; WDI 281 - 285.

K. SUZUKI et al.; "HIGH-GAIN ERBIUM-DOPED FIBER AMPLIFIER PUMPED BY 820 nm GaAlAs LASER DIODES"; Optical Amplifiers and Their Applications; Technical Digest 1990, Series Volume 13, MB4 20 - 23.

B. MIKKELSEN et al.; "HIGH RECEIVER SENSITIVITY AT 2.5 Gb/s OBTAINED WITH A HIGHLY EFFICIENT LOW NOISE DIODE PUMPED ERBIUM-DOPED FIBER AMPLIFIER"; Optical Amplifiers and Their Applications; Technical Digest 1991, Series Volume 13, FA4-1 192 - FA4-4 195.

H. TAKENAKA et al.; "COMPACT SIZE AND HIGH OUTPUT POWER Er-DOPED FIBER AMPLIFIER MODULES PUMPED WITH 1.48$\mu$m MQW LDs"; Optical Amplifiers and Their Applications; Technical Digest 1991, Series Volume 13, FD2-1 254 - FD2-4 257.

A. WADA et al.; "HIGH-EFFICIENCY ERBIUM-DOPED FIBER AMPLIFIERS USING MODE FIELD DIAMETER ADJUSTING TECHNIQUE"; Optical Amplifiers and Their Applications; Technical Digest 1991, Series Volume 13, FD3-1 257 - FD3-4 261.

D. TANAKA et al.; "73.6km ATTENUATION FREE CONCATENATED FIBERS DOPED WITH DISTRIBUTED ERBIUM"; Optical Amplifiers and Their Applications; Technical Digest 1991, Series Volume 13, ThD4-1 156 - ThD4-4 159.

G. R. JACOBOVITZ-VESELKA et al.; "SINGLE-STAGE BOOSTER AMPLIFIER WITH TWO 980 nm PUMPS STABILIZED BY FIBER GRATING"; Optical Amplifiers and Their Applications; Technical Digest 1995, Series Volume 18; FC4-1 162 - FC4-4 165.

Y. TASHIRO et al.; "HIGH POWER ERBIUM-DOPED OPTICAL FIBER AMPLIFIER"; The Institute of Electronics, Information and Communication Engineers; Technical Report of IEICE, OCS95-86 (1995-10), pgs. 67-72.

UNITED STATES PATENT AND TRADEMARK OFFICE
CERTIFICATE OF CORRECTION

PATENT NO. : 6,369,938 B1
DATED : April 9, 2002
INVENTOR(S) : Yasushi Sugaya et al.

It is certified that error appears in the above-identified patent and that said Letters Patent is hereby corrected as shown below:

M. SHIMIZU et al.; "HIGH SATURATING OPERATION OF 0.98 $\mu$m LASER DIODE PUMPED ERBIUM-DOPED FIBER AMPLIFIERS"; The Institute of Electronics, Information and Communication Engineers; Proceedings of the 1991 IEICE Fall Conference, Tamagawa University, pg. 4-239. (English Language Translation of Section 2)

K. OOSONO et al.; "RELIABILITY STUDY OF ER-DOPED OPTICAL FIBER"; The Institute of Electronics, Information and Communication Engineers; Proceedings of the 1992 IEICE Fall Conference, Tokyo Institute of Technology, pg. 4-282. (English language translation of Section 2 and Table 1)

K. OOSONO et al.; "STUDY OF HIGH OUTPUT POWER ER-DOPED FIBER AMPLIFIER"; The Institute of Electronics, Information and Communication Engineers; Proceedings of the 1992 IEICE Fall Conference, Tokyo Institute of Technology, pg. 4-283. (English language translation of Section 2)

K. TAKANO et al.; "AN OPTICAL PRE-AMPLIFIER WITH AUTOMATIC GAIN CONTROL FUNCTION"; The Institute of Electronics, Information and Communication Engineers; Proceedings of the 1995 IEICE GENERAL Conference, Fukuoka Institute of Technology, pg. 513. (English language translation of Section 2)

Youichi FUKADA, et al.; "GAIN-BANDWIDTH AND NOISE-FIGUREUE MEASURING TECHNIQUE ON AN OPTICAL IN-LINE AMPLIFIER"; Technical Report of IEICE; OCS94-69, OPE94-92 (1994-11)

H. TOBA, et al.; "100-CHANNEL OPTICAL FDM TRANSMISSION/ DISTRIBUTION AT 622 Mb/s OVER 50 km"; Journal of Lightwave Technology, Vol. 8, No. 9, Sept.1990; Pages 1396-1401

J.M. P. DELAVAUX et al.; "HYBRID Er-DOPED FIBER AMPLIFIERS AT 980-1480 nm FOR LONG DISTANCE OPTICAL COMMUNICATIONS"; Electronics Letters 13th Aug. 1992, Vol. 28, No. 17.

UNITED STATES PATENT AND TRADEMARK OFFICE
CERTIFICATE OF CORRECTION

PATENT NO.    : 6,369,938 B1
DATED         : April 9, 2002
INVENTOR(S)   : Yasushi Sugaya et al.

It is certified that error appears in the above-identified patent and that said Letters Patent is hereby corrected as shown below:

S. G. GRUBB et al.; "ULTRAHIGH POWER DIODE-PUMPED 1.5-$\mu$m FIBER AMPLIFIERS"; OFC '96 Technical Digest Series, Vol. 2; February 25 - March 1, 1996.

Signed and Sealed this

Seventeenth Day of December, 2002

JAMES E. ROGAN
*Director of the United States Patent and Trademark Office*